(12) United States Patent
Ohno et al.

(10) Patent No.: US 10,435,103 B2
(45) Date of Patent: Oct. 8, 2019

(54) LEANING VEHICLE

(71) Applicant: YAMAHA HATSUDOKI KABUSHIKI KAISHA, Iwata-shi, Shizuoka (JP)

(72) Inventors: Kohsuke Ohno, Shizuoka (JP); Takayuki Sano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 167 days.

(21) Appl. No.: 15/841,615

(22) Filed: Dec. 14, 2017

(65) Prior Publication Data
US 2018/0170474 A1    Jun. 21, 2018

(30) Foreign Application Priority Data

Dec. 15, 2016    (JP) .................. 2016-243289

(51) Int. Cl.
| | |
|---|---|
| *B62K 5/08* | (2006.01) |
| *B62K 5/027* | (2013.01) |
| *B62K 5/10* | (2013.01) |
| *B62K 5/05* | (2013.01) |
| *B62K 5/00* | (2013.01) |

(52) U.S. Cl.
CPC ............ *B62K 5/08* (2013.01); *B62K 5/027* (2013.01); *B62K 5/05* (2013.01); *B62K 5/10* (2013.01); *B62K 2005/001* (2013.01)

(58) Field of Classification Search
CPC . B62K 5/05; B62K 5/027; B62K 5/10; B62K 5/08; B62K 2005/001
See application file for complete search history.

(56) References Cited

U.S. PATENT DOCUMENTS

| | | |
|---|---|---|
| 4,740,004 A | 4/1988 | McMullen |
| 2005/0167174 A1 | 8/2005 | Marcacci |
| 2010/0194068 A1 | 8/2010 | Henderson |
| 2013/0313802 A1 | 11/2013 | Kraus et al. |

FOREIGN PATENT DOCUMENTS

| | | |
|---|---|---|
| EP | 2 905 209 A1 | 8/2015 |
| EP | 3 006 312 A1 | 4/2016 |
| GB | 2 279 047 A | 12/1994 |
| JP | 2005-313876 A | 11/2005 |

*Primary Examiner* — Kevin Hurley
(74) *Attorney, Agent, or Firm* — Keating and Bennett, LLP

(57) ABSTRACT

A first steering inter-axis distance between a left steering bearing and a right bearing of a linkage differs from a second steering inter-axis distance between a left joint steering bearing and a right joint steering bearing of a steering force transmission. A difference between a first left leaning inter-axis distance between a lower intermediate leaning bearing and a lower left leaning bearing and a second left leaning inter-axis distance between an intermediate joint leaning bearing and a left joint leaning bearing is smaller than a difference between a first left steering inter-axis distance between a front intermediate steering bearing and the left steering bearing and a second left steering inter-axis distance between an intermediate joint steering bearing and the left joint steering bearing.

9 Claims, 16 Drawing Sheets

LEANING VEHICLE

CROSS REFERENCE TO RELATED APPLICATIONS

This application claims the benefit of priority to Japanese Patent Application No. 2016-243289 filed on Dec. 15, 2016. The entire contents of this application are hereby incorporated herein by reference.

BACKGROUND OF THE INVENTION

1. Field of the Invention

The present disclosure relates to a leaning vehicle including a leanable body frame and two front wheels.

2. Description of the Related Art

A leaning vehicle described in Japanese Patent Publication No. 2005-313876A includes a body frame and two front wheels that are arranged side by side in a left-right direction of the body frame. The leaning vehicle further includes a linkage. The linkage is configured so as to change relative positions of the two front wheels relative to the body frame to cause the body frame to lean to the left or right of the leaning vehicle when the leaning vehicle so turns.

SUMMARY OF THE INVENTION

The inventors of preferred embodiments of the present application have discovered that a phenomenon in which toe angles of the front wheels (angles of the front wheels relative to a traveling direction when viewed from above) changes in accordance with a leaning angle (an inclination angle of the body frame) in the leaning vehicle described in Japanese Patent Publication No. 2005-313876A. Namely, there is a situation in which the posture of a left front wheel and the posture of a right front wheel do not coincide with each other when the leaning vehicle turns.

Preferred embodiments of the present invention significantly reduce or prevent the occurrence of an inconsistency in posture between a left front wheel and a right front wheel when a leaning vehicle including a leanable body frame and two front wheels turns.

According to a preferred embodiment of the present invention, a leaning vehicle includes a body frame; a left front wheel and a right front wheel that are arranged side by side in a left-right direction of the body frame; a linkage that changes relative positions of the left front wheel and the right front wheel to the body frame to cause the body frame to lean to the left or right of the leaning vehicle; a first intermediate steering bearing defining a first intermediate steering turning axis that extends in an up-down direction of the body frame; a first left steering bearing disposed on the left of the first intermediate steering turning axis and defining a first left steering turning axis that extends in the up-down direction of the body frame; a first right steering bearing disposed on the right of the first intermediate steering turning axis and defining a first right steering turning axis that extends in the up-down direction of the body frame; a left suspension coupled to the first left steering bearing and supporting the left front wheel; a right suspension coupled to the first right steering bearing and supporting the right front wheel; a steering member turnable relative to the body frame; and a steering force transmission that turns the left suspension and the right suspension in accordance with a turning action of the steering member from a neutral position thereof, so that the left suspension turns about the first left steering turning axis and the right suspension turns about the first right steering turning axis respectively in a direction that the steering member is turned, wherein the linkage includes a first intermediate leaning bearing defining a first intermediate leaning turning axis that extends in a front-rear direction of the body frame; a first left leaning bearing disposed on the left of the first intermediate leaning bearing and defining a first left leaning turning axis that extends in the front-rear direction of the body frame; a first right leaning bearing disposed on the right of the first intermediate leaning bearing and defining a first right leaning turning axis that extends in the front-rear direction of the body frame; and a leaning turnable member coupled to the first intermediate leaning bearing and being turnable about the first intermediate leaning turning axis; a left portion of the leaning turnable member is coupled to the first left leaning bearing and is turnable about the first left leaning turning axis; a right portion of the leaning turnable member is coupled to the first right leaning bearing and is turnable about the first right leaning turning axis; the first left leaning bearing is displaced relative to the body frame in accordance with a leaning action of the body frame such that the left suspension is displaced relative to the right suspension while changing a posture thereof relative to the leaning turnable member; the first right leaning bearing is displaced relative to the body frame in accordance with a leaning action of the body frame such that the right suspension is displaced relative to the left suspension while changing a posture thereof relative to the leaning turnable member; the steering force transmission includes a steering turnable member coupled to the first intermediate steering bearing and that turns about the first intermediate steering turning axis in accordance with a turning action of the steering member in a direction that the steering member is turned; a transmission member that transmits a turning force of the steering member to the left suspension and the right suspension; a second intermediate leaning bearing defining a second intermediate leaning turning axis that extends in the front-rear direction of the body frame; a second left leaning bearing disposed on the left of the second intermediate leaning bearing and defining a second left leaning turning axis that extends in the front-rear direction of the body frame; a second right leaning bearing disposed on the right of the second intermediate leaning bearing and defining a second right leaning turning axis that extends in the front-rear direction of the body frame; a second intermediate steering bearing defining a second intermediate steering turning axis that extends in the up-down direction of the body frame; a second left steering bearing disposed on the left of the second intermediate steering bearing and defining a second left steering turning axis that extends in the up-down direction of the body frame; and a second right steering bearing disposed on the right of the second intermediate steering bearing and defining a second right steering turning axis that extends in the up-down direction of the body frame; the transmission member is coupled to the steering turnable member and is turnable about each of the second intermediate leaning turning axis and the second intermediate steering turning axis; the transmission member is coupled to the left suspension and is turnable about each of the second left leaning turning axis and the second left steering turning axis; the transmission member is coupled to the right suspension and is turnable about each of the second right leaning turning axis and the second right steering turning axis; when the body frame is in an upright state and the steering member is in the neutral position: an inclination angle of each of the first left steering turning axis and the first right steering turning axis relative to a vertical direction is substantially zero when the leaning vehicle is viewed from the front; a first steering inter-axis distance between the first left steering bearing and the first right steering bearing differs from a second steering inter-axis distance between the second left steering bearing and the second right steering bearing; a difference between a first left leaning inter-axis distance between the first intermediate leaning bearing and the first left leaning bearing and a second left leaning inter-axis distance between the second intermediate leaning bearing and the second left leaning bearing is smaller than a difference between a first left steering inter-axis distance between the first intermediate steering bearing and the first left steering bearing and a second left steering inter-axis distance between the second intermediate steering bearing and the second left steering bearing; and a difference between a first right leaning inter-axis distance between the first intermediate leaning bearing and the first right leaning bearing and a second right leaning inter-axis distance between the second intermediate leaning bearing and the second right leaning bearing is smaller than a difference between a first right steering inter-axis distance between the first intermediate steering bearing and the first right steering bearing and a second right steering inter-axis distance between the second intermediate steering bearing and the second right steering bearing.

The inventors of preferred embodiments of the present invention have discovered that in the leaning vehicle described in Japanese Patent Publication No. 2005-313876A, the difference between a turning angle of a member corresponding to the transmission member and a turning angle of a member corresponding to the leaning turnable member when the body frame leans causes the phenomenon in which the toe angles of the left and right front wheels change as the body frame leans.

The leaning vehicle described in Japanese Patent Publication No. 2005-313876A uses the so-called Ackermann steering geometry. Namely, in a state such that the body frame is standing upright and the steering member is in the neutral position thereof, a dimension corresponding to the first steering inter-axis distance and a dimension corresponding to the second steering inter-axis distance differ from each other. Additionally, in the leaning vehicle described in Japanese Patent Publication No. 2005-313876A, a difference between a dimension corresponding to the first left leaning inter-axis distance and a dimension corresponding to the second left leaning inter-axis distance coincides with a difference between a dimension corresponding to the first left steering inter-axis distance and a dimension corresponding to the second left steering inter-axis distance. Similarly, a difference between a dimension corresponding to the first right leaning inter-axis distance and a dimension corresponding to the second right leaning inter-axis distance coincides with a difference between a dimension corresponding to the first right steering inter-axis distance and a dimension corresponding to the second right steering inter-axis distance. The inventors of preferred embodiments of the present invention have discovered that this configuration causes a difference between a turning angle of a member corresponding to the transmission member and a turning angle of a member corresponding to the leaning turnable member as the body frame leans.

The inventors of preferred embodiments of the present invention have discovered that an amount of change in toe angle of the left front wheel that is caused as the body frame leans is able to be reduced by making a difference between the first left leaning inter-axis distance and the second left leaning inter-axis distance smaller than a difference between the first left steering inter-axis distance and the second left steering inter-axis distance on the premise of the Ackermann steering geometry. Similarly, the inventors of preferred embodiments of the present invention have discovered that an amount of change in toe angle of the right front wheel that is caused as the body frame leans is able to be reduced by making a difference between the first right leaning inter-axis distance and the second right leaning inter-axis distance smaller than a difference between the first right steering inter-axis distance and the second right steering inter-axis distance. Namely, according to the construction described above, the amounts of change in toe angles of the two front wheels resulting when the leaning vehicle turns are able to be reduced.

On the other hand, when viewing the leaning vehicle, which is standing upright without being steered, from the front thereof, inclination angles of the left steering turning axis and the right steering turning axis from the vertical direction are both substantially zero. Consequently, the difference between a leaning angle of the left front wheel and a leaning angle of the right front wheel when the body frame is caused to lean is significantly reduced or prevented.

It is possible to significantly reduce or prevent the occurrence of an inconsistency in posture between the left front wheel and the right front wheel when the leaning vehicle including the leanable body frame and the two front wheels turns by the synergy between the reduction in amount of change in toe angle and the suppression of a difference in leaning angle.

Specifically, an offset in the left-right direction of the body frame is provided in at least one of: between the first intermediate leaning bearing and the first intermediate steering bearing; between the first left leaning bearing and the first left steering bearing; between the second intermediate leaning bearing and the second intermediate steering bearing; and between the second left leaning bearing and the second left steering bearing; such that, when the leaning vehicle is viewed from the front, the difference between the first left leaning inter-axis distance and the second left leaning inter-axis distance is smaller than the difference between the first left steering inter-axis distance and the second left steering inter-axis distance.

Similarly, an offset in the left-right direction of the body frame is provided in at least one of: between the first intermediate leaning bearing and the first intermediate steering bearing; between the first right leaning bearing and the first right steering bearing; between the second intermediate leaning bearing and the second intermediate steering bearing; and between the second right leaning bearing and the second right steering bearing; such that, when the leaning vehicle is viewed from the front, the difference between the first right leaning inter-axis distance and the second right leaning inter-axis distance is smaller than the difference between the first right steering inter-axis distance and the second right steering inter-axis distance.

Preferably, an offset in the left-right direction of the body frame is provided in at least one of: between the first left leaning bearing and the first left steering bearing; and between the second left leaning bearing and the second left steering bearing; such that, when the leaning vehicle is viewed from the front, the difference between the first left leaning inter-axis distance and the second left leaning inter-axis distance is smaller than the difference between the first left steering inter-axis distance and the second left steering inter-axis distance.

Similarly, an offset in the left-right direction of the body frame is provided in at least one of: between the first right leaning bearing and the first right steering bearing; and between the second right leaning bearing and the second right steering bearing; such that, when the leaning vehicle is viewed from the front, the difference between the first right leaning inter-axis distance and the second right leaning inter-axis distance is smaller than the difference between the first right steering inter-axis distance and the second right steering inter-axis distance.

In order to offset the first intermediate leaning bearing and the first intermediate steering bearing from each other in the left-right direction of the body frame when viewing the leaning vehicle from the front thereof, it is preferable to provide the leaning turnable member with two members each of which includes a leaning bearing defining the first intermediate leaning bearing. In order to offset the second intermediate leaning bearing and the second intermediate steering bearing from each other in the left-right direction of the body frame when viewing the leaning vehicle from the front thereof, it is preferable to provide the transmission member with two members each of which includes a leaning bearing defining the second intermediate leaning bearing. With the structure described above, it is possible to significantly reduce or prevent the inconsistency in posture between the left front wheel and the right front wheel which is caused when the leaning vehicle turns by the use of a simpler construction.

More preferably, an offset in the left-right direction of the body frame is provided in at least one of: between the second intermediate leaning bearing and the second intermediate steering bearing; and between the second left leaning bearing and the second left steering bearing; such that, when the leaning vehicle is viewed from the front, the difference between the first left leaning inter-axis distance and the second left leaning inter-axis distance is smaller than the difference between the first left steering inter-axis distance and the second left steering inter-axis distance.

Similarly, an offset in the left-right direction of the body frame is provided in at least one of: between the second intermediate leaning bearing and the second intermediate steering bearing; and between the second right leaning bearing and the second right steering bearing; such that, when the leaning vehicle is viewed from the front, the difference between the first right leaning inter-axis distance and the second right leaning inter-axis distance is smaller than the difference between the first right steering inter-axis distance and the second right steering inter-axis distance.

A size of the transmission member is generally smaller than those of the linkage and the left suspension. Because of this, the arrangement of the first left steering bearing and the first left leaning bearing is able to be changed relatively easily so that the difference between the first left leaning inter-axis distance and the second left leaning inter-axis distance is smaller than the difference between the first left steering inter-axis distance and the second left steering inter-axis distance, while satisfying the required rigidity.

Similarly, a size of the transmission member is smaller than those of the linkage and the right suspension. Because of this, the arrangement of the first right joint steering bearing and the first right leaning bearing is able to be changed relatively easily so that the difference between the first right leaning inter-axis distance and the second right leaning inter-axis distance is smaller than the difference between the first right steering inter-axis distance and the second right steering inter-axis distance, while satisfying the required rigidity.

According to a preferred embodiment of the present invention, the leaning vehicle may include a structure such that: the second intermediate leaning bearing includes a second left-intermediate leaning bearing and a second right-intermediate leaning bearing; the transmission member includes: a left transmission member including the second left leaning bearing and the second left steering bearing, and being turnable about each of the second left-intermediate leaning bearing and the second intermediate steering bearing; and a right transmission member including the second right leaning bearing and the second right steering bearing, and being turnable about each of the second right-intermediate leaning bearing and the second intermediate steering bearing; when the body frame is in the upright state and the steering member is in the neutral position: a difference between a distance between the first intermediate leaning bearing and the first left leaning bearing and a distance between the second left-intermediate leaning bearing and the second left leaning bearing is smaller than a difference between a distance between the first intermediate steering bearing and the first left steering bearing and a distance between the second intermediate steering bearing and the second left steering bearing; and a difference between a distance between the first intermediate leaning bearing and the first right leaning bearing and a distance between the second right-intermediate leaning bearing and the second right leaning bearing is smaller than a difference between a distance between the first intermediate steering bearing and the first right steering bearing and a distance between the second intermediate steering bearing and the second right steering bearing.

According to a preferred embodiment of the present invention, the leaning vehicle may include a structure such that: the linkage includes an upper cross member and a lower cross member disposed below the upper cross member in the up-down direction of the body frame; the upper cross member and the lower cross member maintain postures thereof that are parallel to each other when changing the relative positions of the left front wheel and the right front wheel to the body frame to cause the body frame to lean to the left or right of the leaning vehicle; and the leaning turnable member is at least one of the upper cross member and the lower cross member.

In this case, the above leaning vehicle according to a preferred embodiment of the present invention may include a structure such that: the linkage further includes a left side member supporting the left suspension turnably via the first left steering bearing, and a right side member supporting the right suspension turnably via the first right steering bearing; and the upper cross member, the lower cross member, the left side member, and the right side member are turnably connected with one another such that the upper cross member and the lower cross member are held in postures that are parallel to each other, and such that the left side member and the right side member are held in postures that are parallel to each other.

According to a preferred embodiment of the present invention, the above leaning vehicle may include a structure such that: the first intermediate leaning bearing includes: a first left-intermediate leaning bearing defining a first left-intermediate leaning turning axis that extends in the front-rear direction of the body frame; and a first right-intermediate leaning bearing defining a first right-intermediate leaning turning axis that extends in the front-rear direction of the body frame; when the body frame is in the upright state and the steering member is in the neutral position: a difference between a distance between the first left-intermediate leaning bearing and the first left leaning bearing and a distance between the second intermediate leaning bearing and the second left leaning bearing is smaller than a difference between a distance between the first intermediate steering bearing and the first left steering bearing and a distance between the second intermediate steering bearing and the second left steering bearing; and a difference between a distance between the first right-intermediate leaning bearing and the first right leaning bearing and a distance between the second intermediate leaning bearing and the second right leaning bearing is smaller than a difference between a distance between the first intermediate steering bearing and the first right steering bearing and a distance between the second intermediate steering bearing and the second right steering bearing.

According to a preferred embodiment of the present invention, the above leaning vehicle may include a structure such that: each of the first intermediate steering bearing, the first left steering bearing, the first right steering bearing, the first intermediate leaning bearing, the first left leaning bearing, the first right leaning bearing, the second intermediate steering bearing, the second left steering bearing, the second right steering bearing, the second intermediate leaning bearing, the second left leaning bearing, and the second right leaning bearing is a cylindrical bearing.

With the above structure, the offset arrangements of the leaning axes and the steering axes are achieved less expensively than a case where spherical bearings are used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
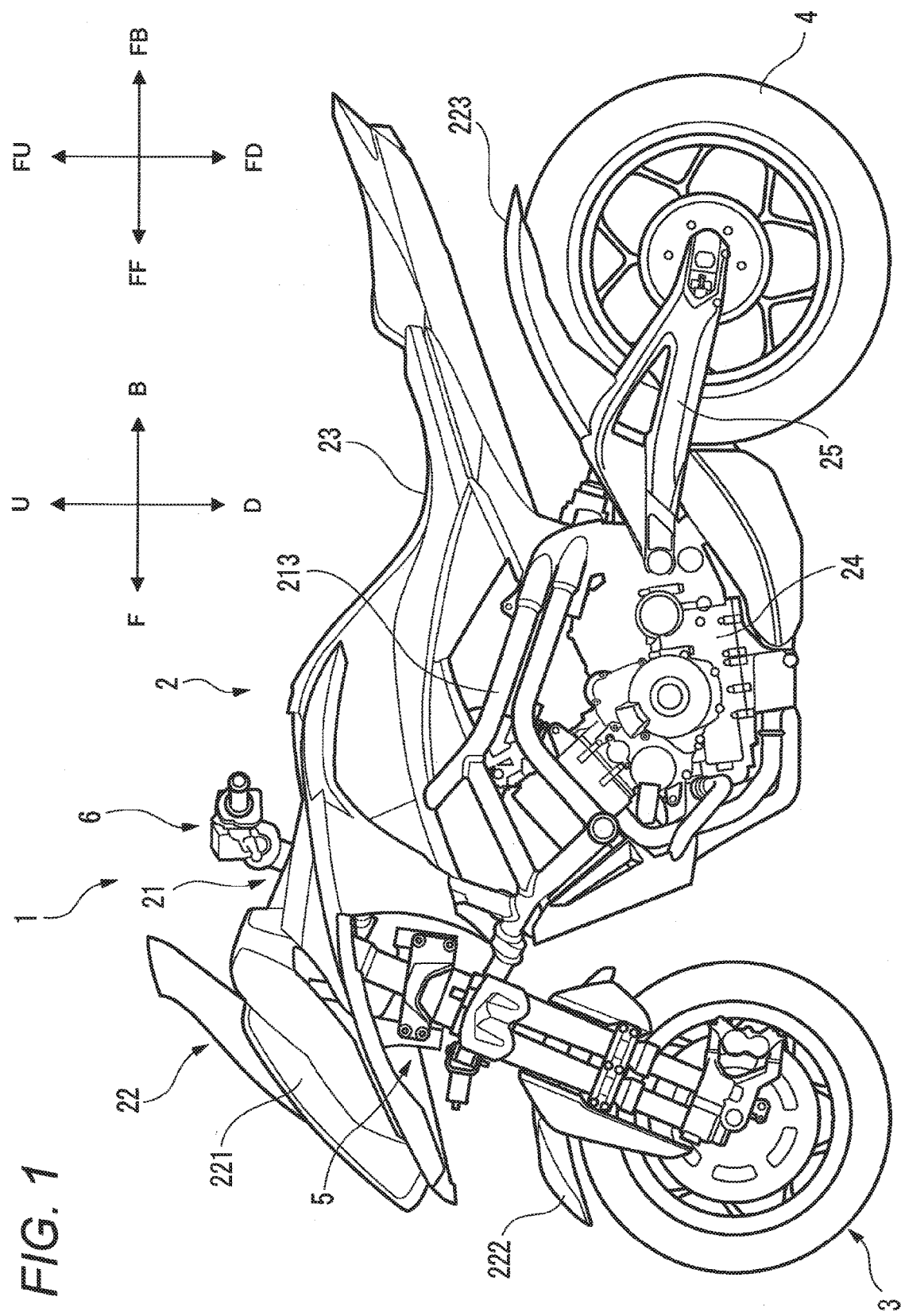
FIG. 1 is a left side view illustrating an entire leaning vehicle according to a preferred embodiment of the present invention.

Referring to the accompanying drawings, exemplary preferred embodiments of the present invention will be described in detail below.

In the accompanying drawings, an arrow F denotes a front or forward direction of a leaning vehicle. An arrow B denotes a back/rear or backward/rearward direction of the leaning vehicle. An arrow U denotes an up or upward direction of the leaning vehicle. An arrow D denotes a down or downward direction of the leaning vehicle. An arrow R denotes a right or rightward direction of the leaning vehicle. An arrow L denotes a left or leftward direction of the leaning vehicle.

A leaning vehicle turns with a body frame being caused to lean to the left or right of the leaning vehicle from a vertical direction. Then, in addition to the directions based on the leaning vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed from a rider who rides the leaning vehicle. "A side of or sideways of the body frame" means directly on the right or left in the left-right direction of the body frame.

In this description, an expression "extending in the front-rear direction of the leaning vehicle body frame" includes a fact that it extends while being inclined in relation to the front-rear direction of the leaning vehicle body frame and means that it extends in a direction closer to the front-rear direction of the leaning vehicle body frame than the left-right direction and up-down direction of the leaning vehicle body frame.

In this description, an expression "extending in the left-right direction of the leaning vehicle body frame" includes a fact that it extends while being inclined in relation to the left-right direction of the leaning vehicle body frame and means that it extends in a direction closer to the left-right direction of the leaning vehicle body frame than the front-rear direction and up-down direction of the leaning vehicle body frame.

In this description, an expression "extending in the up-down direction of the leaning vehicle body frame" includes a fact that it extends while being inclined in relation to the up-down direction of the leaning vehicle body frame and means that it extends in a direction closer to the up-down direction of the leaning vehicle body frame than the left-right direction and front-rear direction of the leaning vehicle body frame.

In this description, an expression reading the "leaning vehicle is standing upright or in an upright state" or the "body frame is standing upright or in the upright state" means a state in which the leaning vehicle is not steered at all and the up-down direction of the body frame coincides with the vertical direction. In this state, the directions based on the leaning vehicle coincide with the directions based on the body frame. When the leaning vehicle is turning with the body frame caused to lean to the left or right from the vertical direction, the left-right direction of the leaning vehicle does not coincide with the left-right direction of the body frame. Similarly, the up-down direction of the leaning vehicle does not coincide with the up-down direction of the body frame. However, the front-rear direction of the leaning vehicle coincides with the front-rear direction of the body frame.

In this description, an expression reading "directly on the left of a member A in the left-right direction of the body frame" denotes a space through which the member A passes when the member A is translated to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is translated to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is translated upwards in the up-down direction of the body frame. An expression reading "directly below the member A" is also defined in the same way.

In this description, an expression reading "above the member A in the up-down direction of the body frame" includes not only the space through which the member A passes when the member A is translated upwards in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is translated to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is translated to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

Referring to FIGS. 1 to 11, leaning vehicles according to preferred embodiments of the present invention will be described. As illustrated in FIG. 1, a leaning vehicle 1 according to a preferred embodiment of the present invention includes a leaning vehicle main body 2, two front wheels 3, a rear wheel 4, a linkage 5 and a steering member 6. The leaning vehicle 1 is a leaning vehicle that includes a leanable body frame and the two front wheels arranged side by side in a left-right direction of the body frame.

The leaning vehicle main body 2 includes a body frame 21, a body cover 22, a seat 23, an engine unit 24, and a rear arm 25.

In FIG. 1, the body frame 21 is in an upright state. The following description to be made while referring to FIG. 1 is based on the premise that the body frame 21 is in the upright state. FIG. 1 is a left side view of the leaning vehicle 1 resulting when the entire leaning vehicle 1 is viewed from the left in the left-right direction of the body frame 21.

Figure 2:
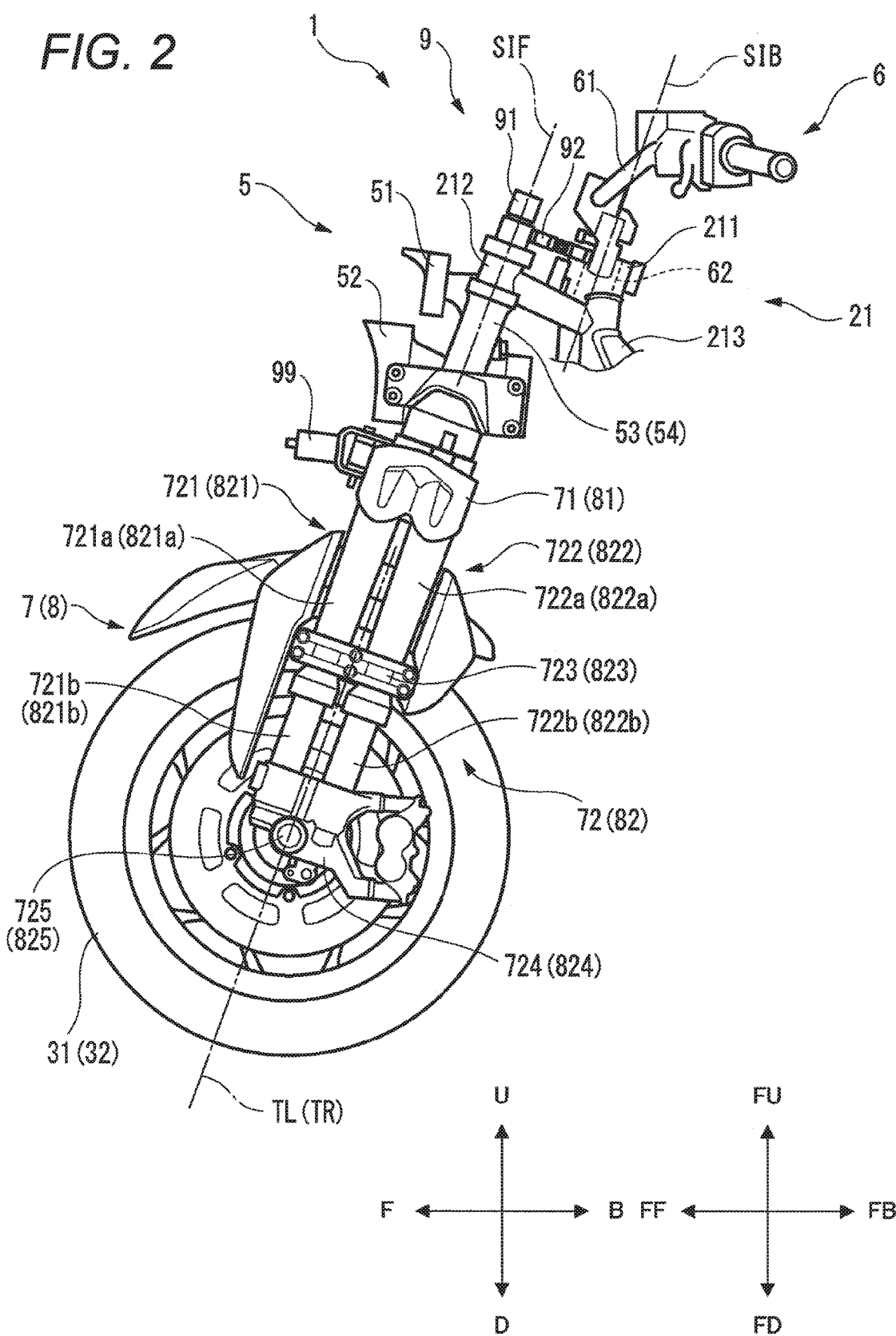
FIG. 2 is a left side view illustrating a front portion of the leaning vehicle of FIG. 1 in an enlarged manner.

FIG. 2 is a side view of a front portion of the leaning vehicle 1 resulting when the front portion is viewed from the left in the left-right direction of the body frame 21. In FIG. 2, the body frame 21 is in the upright state. The following description to be made while referring to FIG. 2 is based on the premise that the body frame 21 is in the upright state.

The body frame 21 includes a head pipe 211, a link support 212 and a main frame 213. The head pipe 211 supports the steering member 6. The link support 212 supports the linkage 5. The main frame 213 supports the seat 23, the engine unit 24 and the rear arm 25.

The rear arm 25 is disposed behind the main frame 213 in a front-rear direction of the body frame 21. The rear arm 25 extends in the front-rear direction of the body frame 21. A front end portion of the rear arm 25 is supported by the main frame 213 and the engine unit 24, so that the front end portion of the rear arm 25 is allowed to turn about an axis that extends in the left-right direction of the body frame 21. A rear end portion of the rear arm 25 supports the rear wheel 4.

The body cover 22 at least partially covers components of the leaning vehicle 1. The body cover 22 includes a front cover 221, a pair of left and right front fenders 222 and a rear fender 223.

As illustrated in FIG. 1, the front cover 221 is disposed ahead of the seat 23 in the front-rear direction of the body frame 21. The front cover 221 covers the linkage 5, the steering member 6 and at least a portion of a steering force transmission 9. The front cover 221 is disposed so as not to be displaced relative to the body frame 21. In FIG. 2, the front cover 221 is omitted from illustration.

At least portions of the pair of left and right front fenders 222 are disposed directly below the front cover 221. At least portions of the pair of left and right front fenders 222 are disposed directly above the pair of left and right front wheels 3, respectively.

At least a portion of the rear wheel 4 is disposed below the seat 23 in an up-down direction of the body frame 21. At least a portion of the rear wheel 4 is disposed directly below the rear fender 223 in the up-down direction of the body frame 21.

The leaning vehicle 1 according to this preferred embodiment is a leaning vehicle on which a rider rides in a posture in which the rider sits astride the body frame 21. Namely, when the rider sits on the seat 23 in riding, a portion of the body frame 21 which is disposed ahead of the seat 23 in the front-rear direction of the body frame 21 is disposed between the legs of the rider. The rider rides the leaning vehicle 1 in a posture in which he or she holds the main frame 213 or the front cover 221 that is positioned ahead of the seat 23 in the front-rear direction of the body frame 21 with his or her legs therebetween.

When viewing the leaning vehicle 1 from the left-right direction of the body frame 21, the engine unit 24 is disposed ahead of a front end of the rear wheel 4 in the front-rear direction of the body frame 21. The engine unit 24 is disposed so as not to be displaced relative to the body frame 21. The engine unit 24 is disposed so as not to be displaced relative to the main frame 213. The engine unit 24 generates power to drive the leaning vehicle 1. The driving force so generated is transmitted to the rear wheel 4.

The head pipe 211 is disposed at a front portion of the leaning vehicle 1. When viewing the leaning vehicle 1 from the left in the left-right direction of the body frame 21, an upper portion of the head pipe 211 is disposed behind a lower portion of the head pipe 211 in the front-rear direction of the body frame 21.

The steering member 6 includes a handlebar 61 and an upstream-side steering shaft 62. The upstream-side steering shaft 62 extends downwards from an intermediate portion of the handlebar 61 in relation to the left-right direction thereof. The upstream-side steering shaft 62 is supported on the head pipe 211 via a rear intermediate steering bearing (not illustrated). By using this structure, the upstream-side steering shaft 62 is able to turn about a rear intermediate steering turning axis SIB relative to the head pipe 211.

The link support 212 is disposed directly ahead of the head pipe 211 in the front-rear direction of the body frame 21. When viewing the leaning vehicle 1 from the left in the left-right direction of the body frame 21, an upper portion of the link support 212 is disposed behind a lower portion of the link support 212 in the front-rear direction of the body frame 21.

Figure 3:
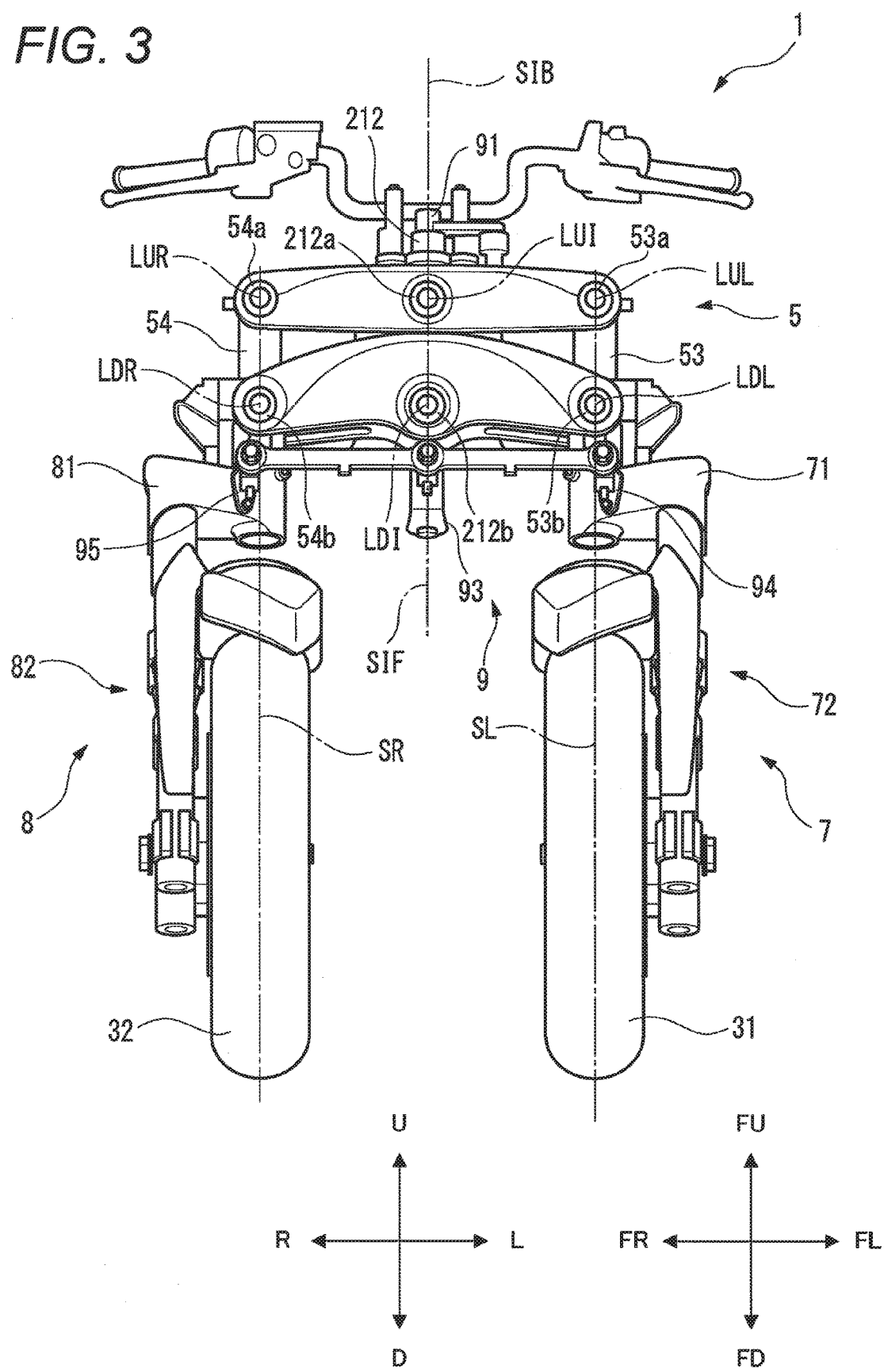
FIG. 3 is a front view illustrating the front portion of the leaning vehicle of FIG. 1.

FIG. 3 is a front view of the leaning vehicle 1 resulting when the front portion of the leaning vehicle 1 is viewed from the front in the front-rear direction of the body frame 21. In FIG. 3, the body frame 21 is in the upright state. The following description to be made while referring to FIG. 3 is based on the premise that the body frame 21 is in the upright state. In FIG. 3, the front cover 221 is omitted from illustration.

The two front wheels 3 include a left front wheel 31 and a right front wheel 32. The left front wheel 31 is disposed on the left of the head pipe 211 and the link support 212 defining a portion of the body frame 21 in the left-right direction of the body frame 21. The right front wheel 32 is disposed on the right of the head pipe 211 and the link support 212 in the left-right direction of the body frame 21. The left front wheel 31 and the right front wheel 32 are arranged side by side in the left-right direction of the body frame 21.

In the leaning vehicle 1 according to this preferred embodiment, the linkage 5 preferably uses a four parallel joint link system (also referred to as a parallelogram link).

The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the upstream-side steering shaft 62 about the rear intermediate steering turning axis SIB which occurs in association with the operation of the handlebar 61. Namely, the linkage 5 does not turn about the rear intermediate steering turning axis SIB relative to the body frame 21.

The link support 212 includes an upper intermediate leaning bearing 212a. An intermediate portion of the upper cross member 51 is supported by the link support 212 via the upper intermediate leaning bearing 212a. The upper cross member 51 is able to turn relative to the link support 212 about an upper intermediate leaning turning axis LUI that passes through the upper intermediate leaning bearing 212a and extends in the front-rear direction of the body frame 21.

The link support 212 includes a lower intermediate leaning bearing 212b. An intermediate portion of the lower cross member 52 is supported by the link support 212 via the lower intermediate leaning bearing 212b. The lower cross member 52 is able to turn relative to the link support 212 about a lower intermediate leaning turning axis LDI that passes through the lower intermediate leaning bearing 212b and extends in the front-rear direction of the body frame 21.

The left side member 53 includes an upper left leaning bearing 53a. A left end portion of the upper cross member 51 is coupled with the left side member 53 via the upper left leaning bearing 53a. The upper cross member 51 is able to turn relative to the left side member 53 about an upper left leaning turning axis LUL that passes through the upper left leaning bearing 53a and extends in the front-rear direction of the body frame 21.

The right side member 54 includes an upper right leaning bearing 54a. A right end portion of the upper cross member 51 is coupled with the right side member 54 via the upper right leaning bearing 54a. The upper cross member 51 is able to turn relative to the right side member 54 about an upper right leaning turning axis LUR that passes through the upper right leaning bearing 54a and extends in the front-rear direction of the body frame 21.

The left side member 53 includes a lower left leaning bearing 53b. A left end portion of the lower cross member 52 is coupled with the left side member 53 via the lower left leaning bearing 53b. The lower cross member 52 is able to turn relative to the left side member 53 about a lower left leaning turning axis LDL that passes through the lower left leaning bearing 53b and extends in the front-rear direction of the body frame 21.

The right side member 54 includes a lower right leaning bearing 54b. A right end portion of the lower cross member 52 is coupled with the right side member 54 via the lower right leaning bearing 54b. The lower cross member 52 is able to turn relative to the right side member 54 about a lower right leaning turning axis LDR that passes through the lower right leaning bearing 54b and extends in the front-rear direction of the body frame 21.

Figure 4:
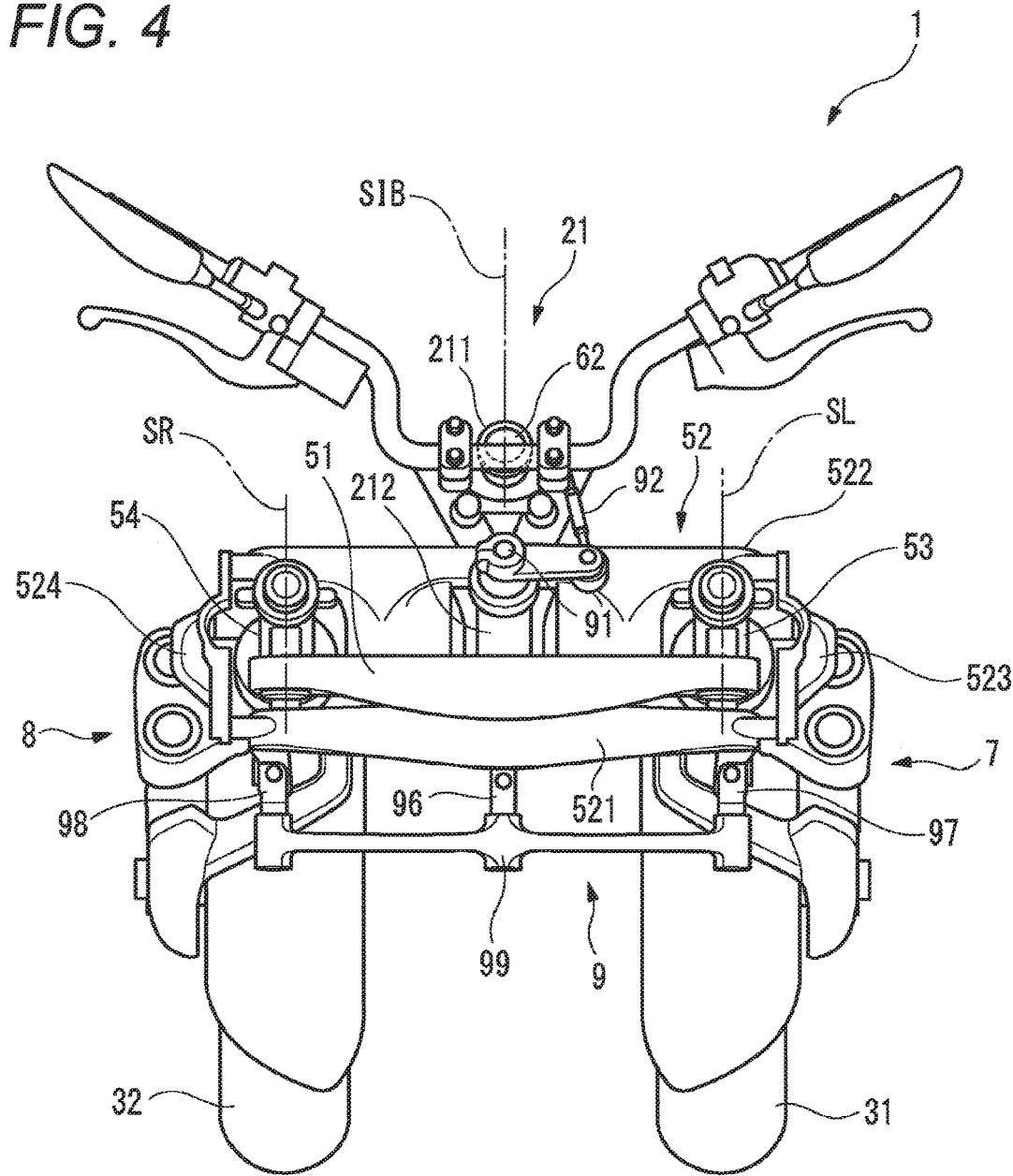
FIG. 4 is a plan view illustrating the front portion of the leaning vehicle of FIG. 1.
Figure 4:
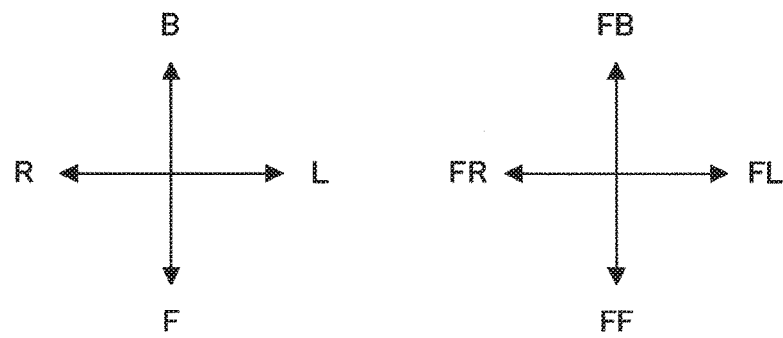

FIG. 4 is a plan view of the front portion of the leaning vehicle 1 when it is viewed from above in the up-down direction of the body frame 21. In FIG. 4, the body frame 21 is in the upright state. The following description to be made while referring to FIG. 4 is based on the premise that the body frame 21 is in the upright state. In FIG. 4, the front cover 221 is omitted from illustration.

The upper cross member 51 is disposed ahead of the link support 212 in the front-rear direction of the body frame 21.

The upper cross member 51 is preferably a plate member that extends in the left-right direction of the body frame 21 without being curved in the front-rear direction of the body frame 21.

As illustrated in FIGS. 2 and 4, the lower cross member 52 is disposed below the upper cross member 51 in the up-down direction of the body frame 21. The lower cross member 52 includes a front element 521 and a rear element 522. The front element 521 is disposed ahead of the link support 212, the left side member 53 and the right side member 54 in the front-rear direction of the body frame 21. The rear element 522 is disposed behind the link support 212, the left side member 53 and the right side member 54 in the front-rear direction of the body frame 21. The front element 521 and the rear element 522 extend in the left-right direction of the body frame 21 without being curved in the front-rear direction of the body frame 21.

As illustrated in FIG. 4, the lower cross member 52 includes a left coupling member 523 and a right coupling member 524. The left coupling member 523 couples a left end portion of the front element 521 and a left end portion of the rear element 522 together. The right coupling member 524 couples a right end portion of the front element 521 and a right end portion of the rear element 522 together.

As illustrated in FIGS. 3 and 4, the left side member 53 is disposed directly on the left of the link support 212 in the left-right direction of the body frame 21. The left side member 53 is disposed above the left front wheel 31 in the up-down direction of the body frame 21. The left side member 53 extends in a direction in which the link support 212 extends. An upper portion of the left side member 53 is disposed behind a lower portion thereof in the front-rear direction of the body frame 21.

As illustrated in FIGS. 3 and 4, the right side member 54 is disposed directly on the right of the link support 212 in the left-right direction of the body frame 21. The right side member 54 is disposed above the right front wheel 32 in the up-down direction of the body frame 21. The right side member 54 extends in the direction in which the link support 212 extends. An upper portion of the right side member 54 is disposed behind a lower portion thereof in the front-rear direction of the body frame 21.

The upper cross member 51, the lower cross member 52, the left side member 53 and the right side member 54 are supported on the link support 212 so that the upper cross member 51 and the lower cross member 52 are kept in a posture in which the upper cross member 51 and the lower cross member 52 are parallel to each other and that the left side member 53 and the right side member 54 are kept in a posture in which the left side member 53 and the right side member 54 are parallel to each other.

As illustrated in FIGS. 2 to 4, the leaning vehicle 1 includes a left suspension 7. The left suspension 7 includes a left bracket 71 and a left shock absorber 72.

Figure 5:
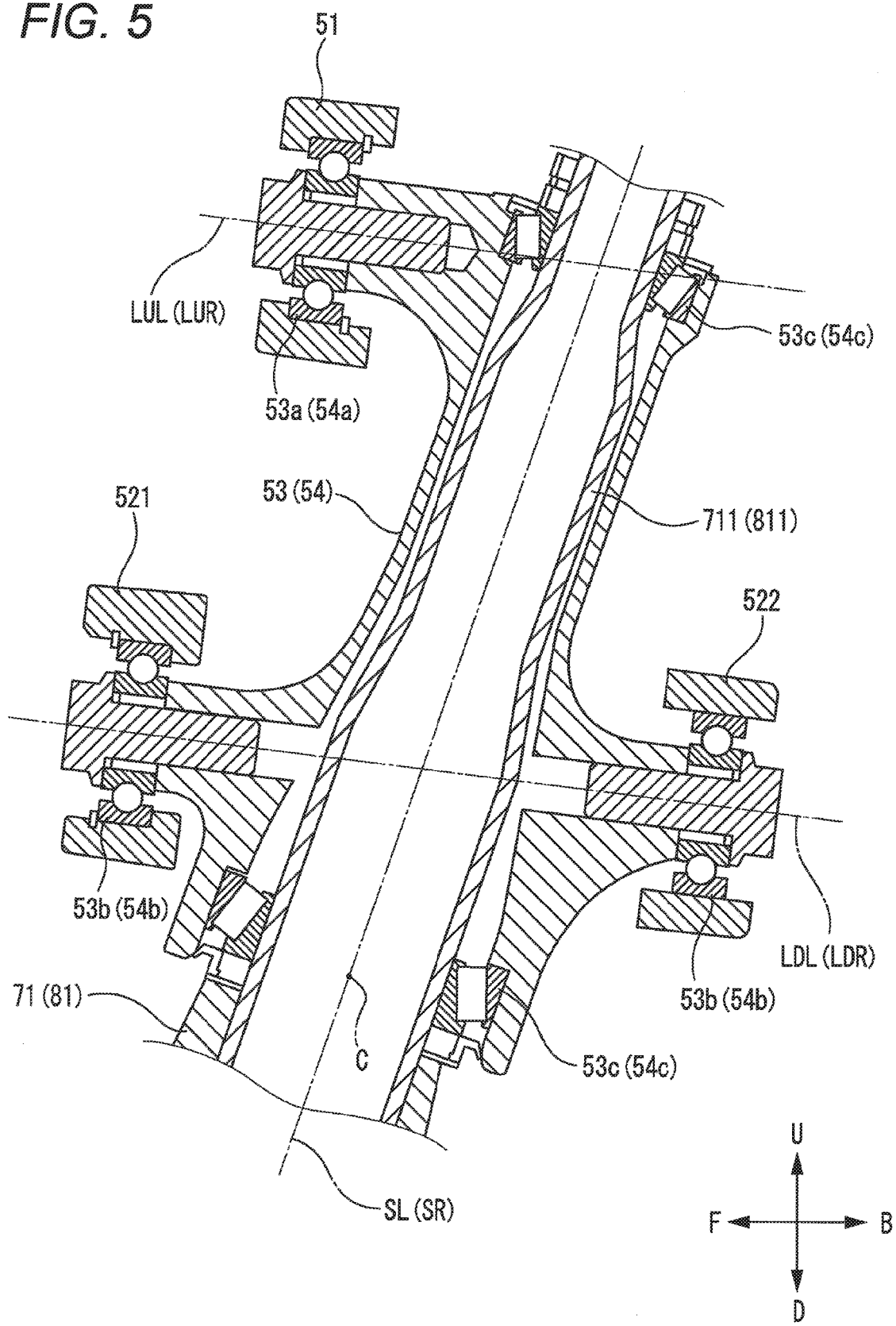
FIG. 5 is a section view illustrating a portion of a linkage in the leaning vehicle of FIG. 1.

FIG. 5 shows a cross section of a portion of the linkage 5 taken along a left steering turning axis SL in FIG. 4 which results when the linkage 5 is viewed from the left of the leaning vehicle 1.

The left bracket 71 includes a left turnable member 711 at an upper portion thereof. The left turnable member 711 is disposed in an interior portion of the left side member 53 and extends in the same direction as a direction in which the left side member 53 extends. The left side member 53 includes a left steering bearing 53c. The left turnable member 711 is supported by the left side member 53 via the left steering bearing 53c. By using this structure, the left turnable member 711 is able to turn relative to the left side member 53 about the left steering turning axis SL. Namely, the left bracket 71 is coupled with the left side member 53 so as to turn relative to the left side member 53 about the left steering turning axis SL.

The left steering turning axis SL extends in the direction in which the left side member 53 extends. As illustrated in FIG. 3, the left steering turning axis SL extends parallel to the rear intermediate steering turning axis SIB of the upstream-side steering shaft 62 in the up-down direction of the body frame 21. As illustrated in FIG. 4, the left steering turning axis SL extends parallel to the rear intermediate steering turning axis SIB of the upstream-side steering shaft 62 in the front-rear direction of the body frame 21.

The left shock absorber 72 is preferably a so-called telescopic shock absorbing mechanism. The left shock absorber 72 attenuates or absorbs a displacement of the left front wheel 31 relative to the linkage 5 in the up-down direction of the body frame 21. As illustrated in FIG. 2, the left shock absorber 72 includes a left front telescopic element 721, a left rear telescopic element 722, a left upper coupling member 723, a left lower coupling member 724 and a left through hole 725.

The left front telescopic element 721 includes a left front outer tube 721a and a left front inner tube 721b. An outer diameter of the left front outer tube 721a is greater than an outer diameter of the left front inner tube 721b. The left front outer tube 721a is supported by the left bracket 71. The left front inner tube 721b is coupled with the left front outer tube 721a so as to be slidable relative to the left front outer tube 721a along a left telescoping axis TL.

The left rear telescopic element 722 includes a left rear outer tube 722a and a left rear inner tube 722b. An outer diameter of the left rear outer tube 722a is greater than an outer diameter of the left rear inner tube 722b. The left rear outer tube 722a is disposed directly behind the left front outer tube 721a in the front-rear direction of the body frame 21. The left rear outer tube 722a is supported by the left bracket 71. The left rear inner tube 722b is disposed directly behind the left front inner tube 721b in the front-rear direction of the body frame 21. The left rear inner tube 722b is coupled with the left rear outer tube 722a so as to be slidable relative to the left rear outer tube 722a along the left telescoping axis TL.

The left upper coupling member 723 couples the left front outer tube 721a and the left rear outer tube 722a together.

The left lower coupling member 724 couples the left front inner tube 721b and the left rear inner tube 722b together.

The left through hole 725 is provided in the left lower coupling member 724. The left through hole 725 supports a left wheel axle 311 of the left front wheel 31 rotatably.

The left shock absorber 72 attenuates or absorbs a displacement of the left front wheel 31 relative to the linkage 5 in the up-down direction of the body frame 21. In particular, the left rear telescopic element 722 defines and functions as a left shock absorber. The left front telescopic element 721, the left upper coupling member 723 and the left lower coupling member 724 restrict the relative turning of the left rear outer tube 722a and the left rear inner tube 722b.

As illustrated in FIGS. 3 and 4, the leaning vehicle 1 includes a right suspension 8. The right suspension 8 includes a right bracket 81 and a right shock absorber 82. The configuration of the right suspension 8 is symmetrical with that of the left suspension 7 when viewing the leaning vehicle 1 from the left thereof in the left-right direction of the body frame 21. Thus, the right suspension 8 is not illustrated separately but reference numerals are illustrated in FIGS. 2 and 5.

The right bracket 81 includes a right turnable member 811 at an upper portion thereof. The right turnable member 811 is disposed in an interior portion of the right side member 54 and extends in the same direction as a direction in which the right side member 54 extends. The right side member 54 includes a right steering bearing 54c. The right turnable member 811 is supported by the right side member 54 via the right steering bearing 54c. By using this structure, the right turnable member 811 is able to turn relative to the right side member 54 about a right steering turning axis SR. Namely, the right bracket 81 is coupled with the right side member 54 so as to turn relative to the right side member 54 about the right steering turning axis SR.

The right steering turning axis SR extends in the direction in which the right side member 54 extends. As illustrated in FIG. 3, the right steering turning axis SR extends parallel to the rear intermediate steering turning axis SIB of the upstream-side steering shaft 62 in the up-down direction of the body frame 21. As illustrated in FIG. 4, the right steering turning axis SR extends parallel to the rear intermediate steering turning axis SIB of the upstream-side steering shaft 62 in the front-rear direction of the body frame 21.

The right shock absorber 82 is preferably a so-called telescopic shock absorber. As illustrated in FIG. 2, the right shock absorber 82 includes a right front telescopic element 821, a right rear telescopic element 822, a right upper bearing 823, a right lower bearing 824 and a right through hole 825.

The right front telescopic element 821 includes a right front outer tube 821a and a right front inner tube 821b. An outer diameter of the right front outer tube 821a is greater than an outer diameter of the right front inner tube 821b. The right front outer tube 821a is supported by the right bracket 81. The right front inner tube 821b is coupled with the right front outer tube 821a so as to be slidable along a right telescoping axis TR.

The right rear telescopic element 822 includes a right rear outer tube 822a and a right rear inner tube 822b. An outer diameter of the right rear outer tube 822a is greater than an outer diameter of the right rear inner tube 822b. The right rear outer tube 822a is disposed directly behind the right front outer tube 821a in the front-rear direction of the body frame 21. The right rear outer tube 822a is supported by the right bracket 81. The right rear inner tube 822b is disposed directly behind the right front inner tube 821b in the front-rear direction of the body frame 21. The right rear inner tube 822b is coupled with the right rear outer tube 822a so as to be slidable relative to the right rear outer tube 822a along the right telescoping axis TR.

The right upper bearing 823 couples the right front outer tube 821a and the right rear outer tube 822a together.

The right lower bearing 824 couples the right front inner tube 821b and the right rear inner tube 822b together.

The right through hole 825 is provided in the right lower bearing 824. The right through hole 825 supports a right wheel axle 321 of the right front wheel 32 rotatably.

The right shock absorber 82 attenuates or absorbs a displacement of the right front wheel 32 relative to the linkage 5 in the up-down direction of the body frame 21. In particular, the right rear telescopic element 822 defines and functions as a right shock absorber. The right front telescopic element 821, the right upper bearing 823 and the right lower bearing 824 restrict the relative turning of the right rear outer tube 822a and the right rear inner tube 822b.

As illustrated in FIGS. 2 to 4, the leaning vehicle 1 includes a steering force transmission 9. The steering force transmission 9 includes a downstream-side steering shaft 91, a coupling device 92, an intermediate transmission plate 93, a left transmission plate 94, a right transmission plate 95, an intermediate joint 96, a left joint 97, a right joint 98 and a tie rod 99.

The downstream-side steering shaft 91 is supported by the link support 212 so as to turn about a front intermediate steering turning axis SIF. The front intermediate steering turning axis SIF extends parallel to the rear intermediate steering turning axis SIB which defines and functions as a turning center of the upstream-side steering shaft 62.

The coupling device 92 couples the upstream-side steering shaft 62 and the downstream-side steering shaft 91 together. The coupling device 92 is displaced as the upstream-side steering shaft 62 turns. The downstream-side steering shaft 91 turns as the coupling device 92 is so displaced. Namely, the coupling device 92 transmits a turning action of the upstream-side steering shaft 62 to the downstream-side steering shaft 91.

Figure 6:
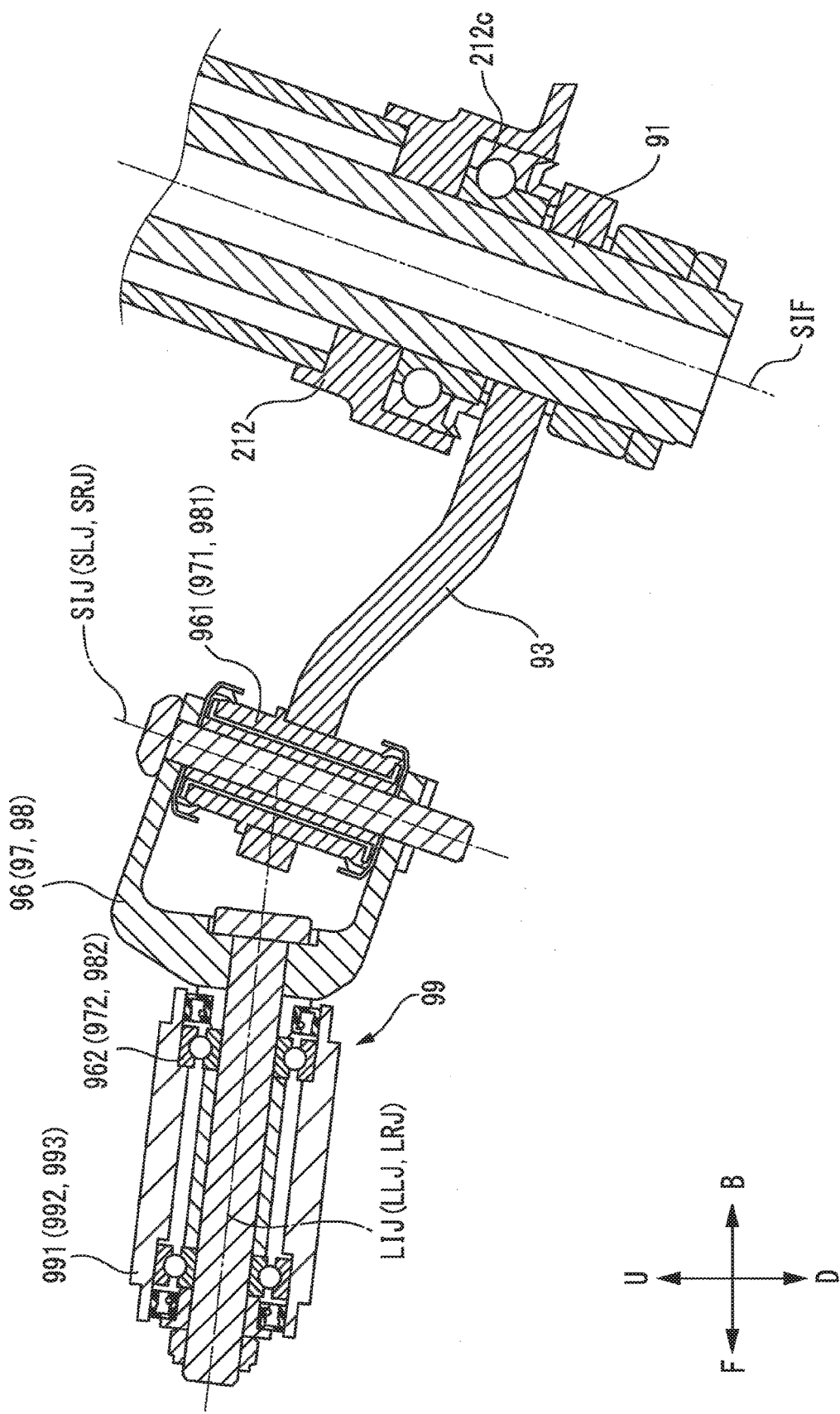
FIG. 6 is a section view illustrating a portion of a steering force transmission in the leaning vehicle of FIG. 1.

FIG. 6 shows a cross section of a portion of the steering force transmission 9 taken along the front intermediate steering turning axis SIF which results when the steering force transmission 9 is viewed from the left of the leaning vehicle 1.

The link support 212 includes a front intermediate steering bearing 212c. The downstream-side steering shaft 91 is supported by the link support 212 via the front intermediate steering bearing 212c. The intermediate transmission plate 93 is connected to a lower portion of the downstream-side steering shaft 91. The intermediate transmission plate 93 cannot turn relative to the downstream-side steering shaft 91. Consequently, the intermediate transmission plate 93 is able to turn about the front intermediate steering turning axis SIF relative to the link support 212 together with the downstream-side steering shaft 91.

As illustrated in FIG. 3, the left transmission plate 94 is disposed directly on the left of the intermediate transmission plate 93 in the left-right direction of the body frame 21. The left transmission plate 94 is connected to the left bracket 71. The left transmission plate 94 cannot turn relative to the left bracket 71. By using this structure, the left transmission plate 94 is able to turn about the left steering turning axis SL relative to the left side member 53.

The right transmission plate 95 is disposed directly on the right of the intermediate transmission plate 93 in the left-right direction of the body frame 21. The right transmission plate 95 is connected to the right bracket 81. The right transmission plate 95 cannot turn relative to the right bracket 81. The right transmission plate 95 is able to turn about the right steering turning axis SR relative to the right side member 54.

As illustrated in FIG. 6, the intermediate joint 96 includes an intermediate joint steering bearing 961. The intermediate joint steering bearing 961 defines and functions as an intermediate joint steering turning axis SIJ that extends in the up-down direction of the body frame 21. The intermediate joint 96 is coupled to a front portion of the intermediate transmission plate 93 via the intermediate joint steering bearing 961. By using this structure, the intermediate joint 96 is able to turn about the intermediate joint steering turning axis SIJ relative to the intermediate transmission plate 93.

As illustrated in FIG. 4, the left joint 97 is disposed on the left of the intermediate joint 96 in the left-right direction of the body frame 21. The left joint 97 includes a left joint steering bearing 971 (only its reference numeral is illustrated in FIG. 6 since its construction is similar to that of the intermediate joint 96). The left joint steering bearing 971 defines and functions as a left joint steering turning axis SLJ that extends in the up-down direction of the body frame 21. The left joint 97 is coupled to a front portion of the left transmission plate 94 via the left joint steering bearing 971. By using this structure, the left joint 97 is able to turn about the left joint steering turning axis SLJ relative to the left transmission plate 94.

As illustrated in FIG. 4, the right joint 98 is disposed on the right of the intermediate joint 96 in the left-right direction of the body frame 21. The right joint 98 includes a right joint steering bearing 981 (only its reference numeral is illustrated in FIG. 6 since its construction is similar to that of the intermediate joint 96). The right joint steering bearing 981 defines and functions as a right joint steering turning axis SRJ that extends in the up-down direction of the body frame 21. The right joint 98 is coupled to a front portion of the right transmission plate 95 via the right joint steering bearing 981. By using this structure, the right joint 98 is able to turn about the right joint steering turning axis SRJ relative to the right transmission plate 95.

As illustrated in FIG. 6, the intermediate joint 96 includes an intermediate joint leaning bearing 962. The intermediate joint leaning bearing 962 defines and functions as an intermediate joint leaning turning axis LIJ that extends in the front- and rear direction of the body frame 21.

The left joint 97 includes a left joint leaning bearing 972 (only its reference numeral is illustrated in FIG. 6 since its construction is similar to that of the intermediate joint 96). The left joint leaning bearing 972 defines and functions as a left joint leaning turning axis LLJ that extends in the front-rear direction of the body frame 21.

The right joint 98 includes a right joint leaning bearing 982 (only its reference numeral is illustrated in FIG. 6 since its construction is similar to that of the intermediate joint 96). The right joint leaning bearing 982 defines and functions as a right joint leaning turning axis LRJ that extends in the front-rear direction of the body frame 21.

Figure 7:
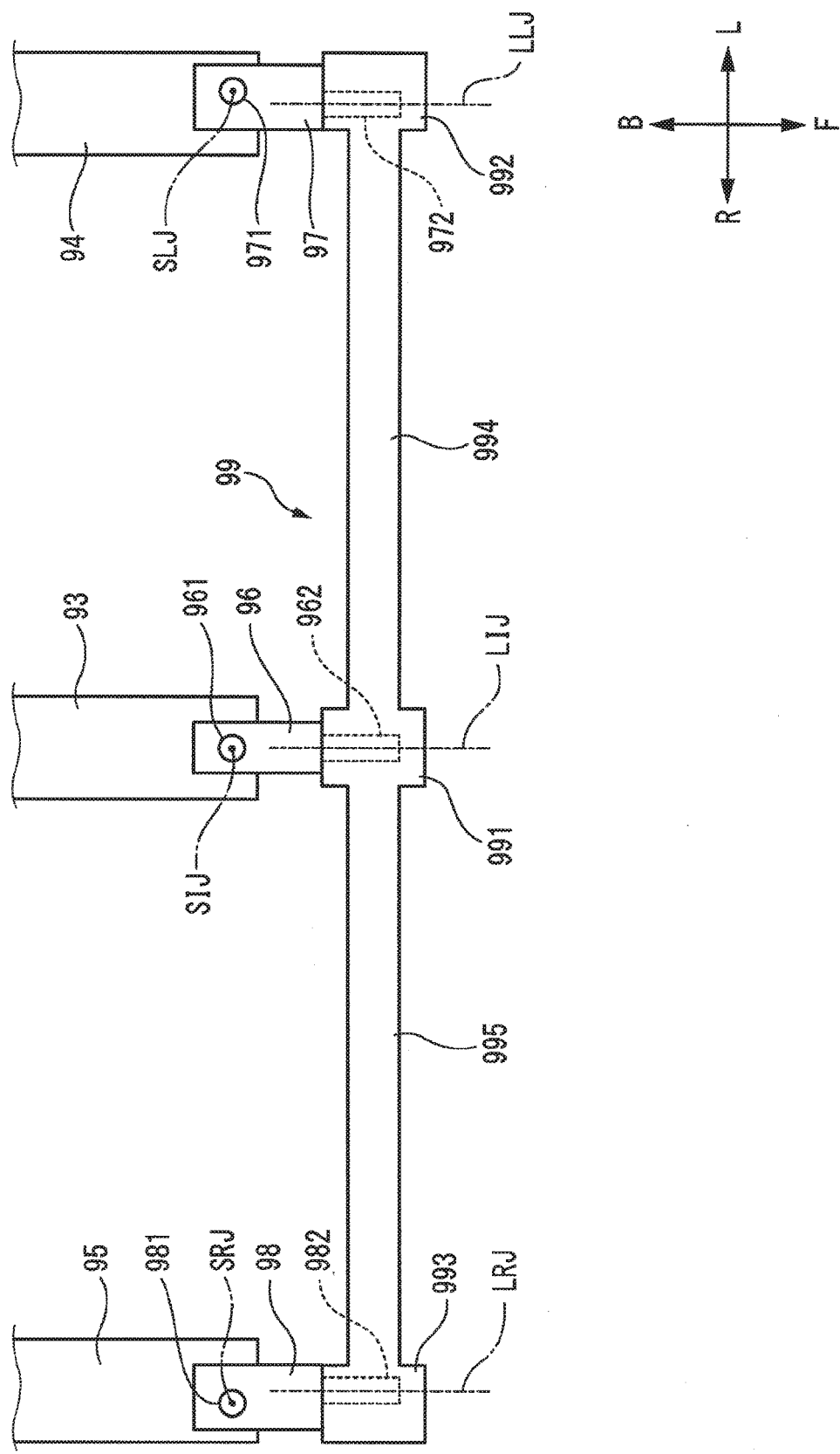
FIG. 7 is a plan view illustrating a portion of the steering force transmission in the leaning vehicle of FIG. 1.

As illustrated in FIGS. 3 and 4, the tie rod 99 extends in the left-right direction of the body frame 21. FIG. 7 shows schematically a coupling construction of the tie rod 99 to the intermediate joint 96, the left joint 97 and the right joint 98.

The tie rod 99 includes an intermediate coupling 991, a left coupling 992, a right coupling 993, a left arm portion 994 and a right arm portion 995. The left coupling 992 is positioned on the left of the intermediate coupling 991 in the left-right direction of the body frame 21. The right coupling 993 is positioned on the right of the intermediate coupling 991 in the left-right direction of the body frame 21. The left arm portion 994 connects the intermediate coupling 991 and the left coupling 992 together. The right arm portion 995 connects the intermediate coupling 991 and the right coupling 993 together.

As illustrated in FIGS. 6 and 7, the intermediate coupling 991 of the tie rod 99 is coupled to the intermediate joint 96 via the intermediate joint leaning bearing 962. By using this structure, the intermediate coupling 991 is able to turn about the intermediate joint leaning turning axis LIJ relative to the intermediate joint 96.

Similarly, the left coupling 992 of the tie rod 99 is coupled to the left joint 97 via the left joint leaning bearing 972. By using this structure, the left coupling 992 is able to turn about the left joint leaning turning axis LLJ relative to the left joint 97.

Similarly, the right coupling 993 of the tie rod 99 is coupled to the right joint 98 via the right joint leaning bearing 982. By using this structure, the right coupling 993 is able to turn about the right joint leaning turning axis LRJ relative to the right joint 98.

The left transmission plate 94 is coupled with the intermediate transmission plate 93 via the left joint 97, the tie rod 99, and the intermediate joint 96. The right transmission plate 95 is coupled with the intermediate transmission plate 93 via the right joint 98, the tie rod 99 and the intermediate joint 96. The left transmission plate 94 and the right transmission plate 95 are coupled with each other via the left joint 97, the tie rod 99 and the right joint 98. In other words, the tie rod 99 couples the intermediate transmission plate 93 to the left transmission plate 94 and the right transmission plate 95.

Figure 8:
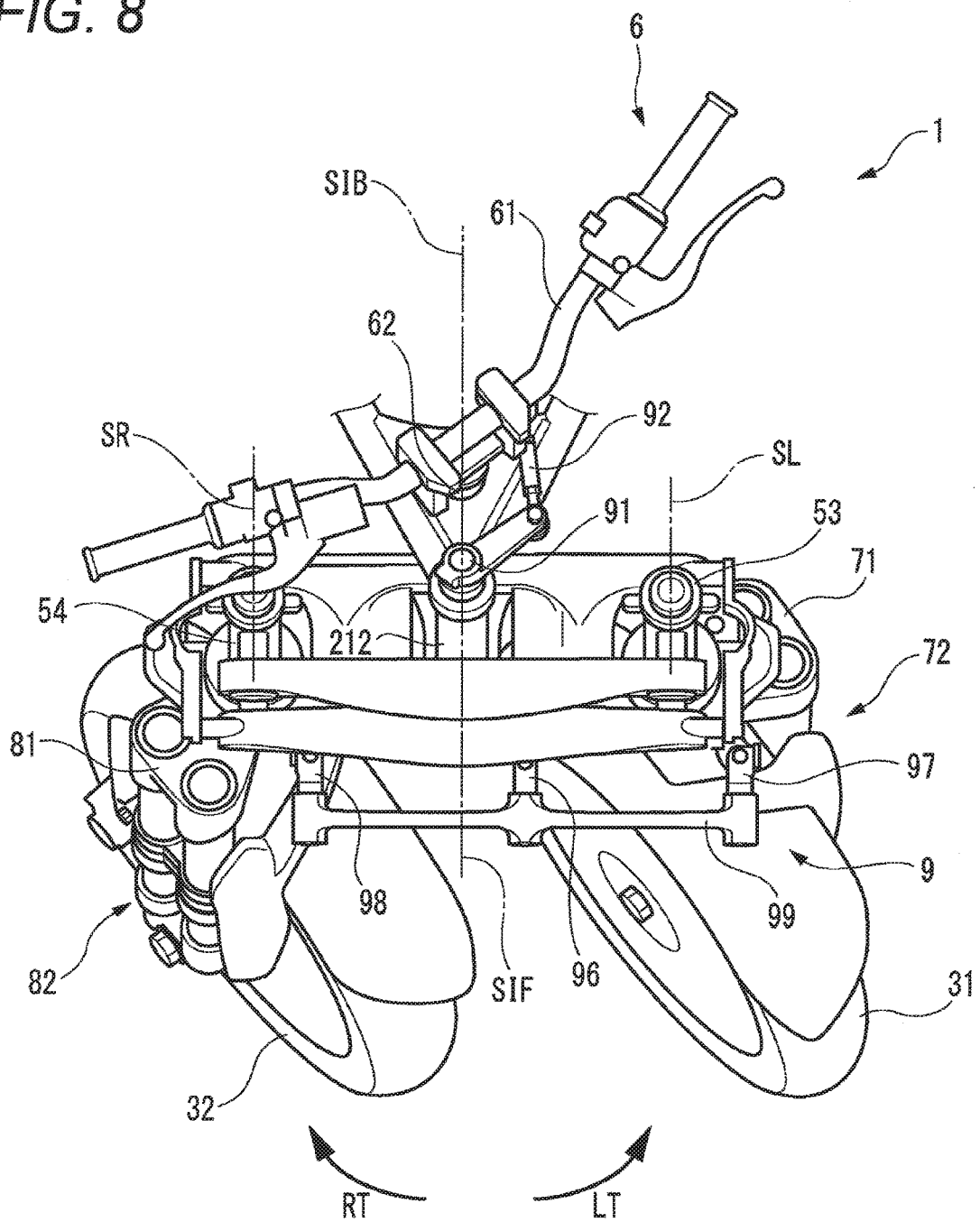
FIG. 8 is a plan view illustrating the front portion of the leaning vehicle of FIG. 1 during steering.
Figure 8:
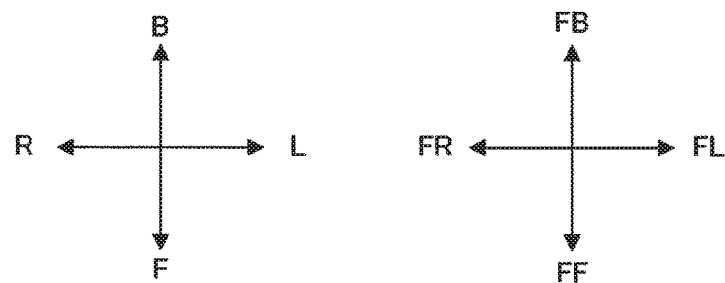

Next, referring to FIGS. 8 and 9, a steering operation of the leaning vehicle 1 will be described. FIG. 8 is a plan view of the front portion of the leaning vehicle 1, with the left front wheel 31 and the right front wheel 32 thereof turned to the left, resulting when the front portion of the leaning vehicle 1 is viewed from above in the up-down direction of the body frame 21. In FIG. 8, the front cover 221 is omitted from illustration.

When the rider operates the handlebar 61, the upstream-side steering shaft 62 turns about the rear intermediate steering turning axis SIB relative to the head pipe 211. The turning action of the upstream-side steering shaft 62 is transmitted to the downstream-side steering shaft 91 via the coupling device 92. By using this structure, the downstream-side steering shaft 91 turns about the front intermediate steering turning axis SIF relative to the link support 212. In the case of the front left and right front wheels being turned to the left as illustrated in FIG. 8, the downstream-side steering shaft 91 turns in a direction indicated by an arrow LT. As the downstream-side steering shaft 91 so turns, the intermediate transmission plate 93 turns in the direction indicated by the arrow LT about the front intermediate steering turning axis SIF relative to the link support 212.

As the intermediate transmission plate 93 turns in the direction indicated by the arrow LT, the intermediate joint 96 turns relative to the intermediate transmission plate 93 in a direction indicated by an arrow RT. This causes the tie rod 99 to move to the left in the left-right direction of the body frame 21 and to the rear in the front-rear direction of the body frame 21 while maintaining its posture.

As the tie rod 99 so moves, the left joint 97 and the right joint 98 turn in the direction indicated by the arrow RT relative to the left transmission plate 94 and the right transmission plate 95, respectively. This causes the left transmission plate 94 and the right transmission plate 95 to turn in the direction indicated by the arrow LT with the tie rod 99 keeping its posture unchanged.

When the left transmission plate 94 turns in the direction indicated by the arrow LT, the left bracket 71, which is not allowed to turn relative to the left transmission plate 94, turns in the direction indicated by the arrow LT about the left steering turning axis SL relative to the left side member 53.

When the right transmission plate 95 turns in the direction indicated by the arrow LT, the right bracket 81, which is not allowed to turn relative to the right transmission plate 95, turns in the direction indicated by the arrow LT about the right steering turning axis SR relative to the right side member 54.

When the left bracket 71 turns in the direction indicated by the arrow LT, the left shock absorber 72, which is supported on the left bracket 71, turns in the direction indicated by the arrow LT about the left steering turning axis SL relative to the left side member 53. When the left shock absorber 72 turns in the direction indicated by the arrow LT, the left front wheel 31, which is supported on the left shock absorber 72, turns in the direction indicated by the arrow LT about the left steering turning axis SL relative to the left side member 53.

When the right bracket 81 turns in the direction indicated by the arrow LT, the right shock absorber 82, which is supported on the right bracket 81, turns in the direction indicated by the arrow LT about the right steering turning axis SR relative to the right side member 54. When the right shock absorber 82 turns in the direction indicated by the arrow LT, the right front wheel 32, which is supported on the right shock absorber 82, turns in the direction indicated by the arrow LT about the right steering turning axis SR relative to the right side member 54.

When the rider operates the handlebar 61 so as to turn the left and right front wheels to the right, the elements described above turn in opposite directions to the directions in which they turn when the left and right front wheels turn to the left. Since the elements merely move reversely in relation to the left-right direction, a detailed description of the reverse movement of the elements will be omitted here.

Thus, as has been described heretofore, the steering member 6 transmits the steering force to the left front wheel 31 and the right front wheel 32 according to the operation of the handlebar 61 by the rider. The left front wheel 31 and the right front wheel 32 turn about the left steering turning axis SL and the right steering turning axis SR, respectively, in the direction corresponding to the direction in which the handlebar 61 is operated by the rider.

Next, referring to FIGS. 3 and 9, a leaning action of the leaning vehicle 1 will be described. FIG. 9 is a front view of the front portion of the leaning vehicle 1 resulting when the leaning vehicle 1 is viewed from the front in the front-rear direction of the body frame 21, illustrating a state where the body frame 21 is caused to lean to the left of the leaning vehicle 1. In FIG. 9, the front cover 221 is omitted from illustration.

As illustrated in FIG. 3, when the leaning vehicle 1 is viewed from the front of the body frame 21 which is standing upright, the linkage 5 exhibits the shape of a rectangle. As illustrated in FIG. 9, when the leaning vehicle 1 is viewed from the front of the body frame 21 which is leaning, the linkage 5 exhibits the shape of a parallelogram. An operation of the linkage 5 is associated with a leaning of the body frame 21 in the left-right direction. The "operation of the linkage 5" means that the shape of the linkage 5 changes as a result of the upper cross member 51 and the lower cross member 52 turning relative to the link support 212 about the upper intermediate leaning turning axis LUI and the lower intermediate leaning turning axis LDI, respectively, and the upper cross member 51, the lower cross member 52, the left side member 53, and the right side member 54 turning relatively about the upper left leaning turning axis LUL, the upper right leaning turning axis LUR, the lower left leaning turning axis LDL and the lower right leaning turning axis LDR, respectively.

Figure 9:
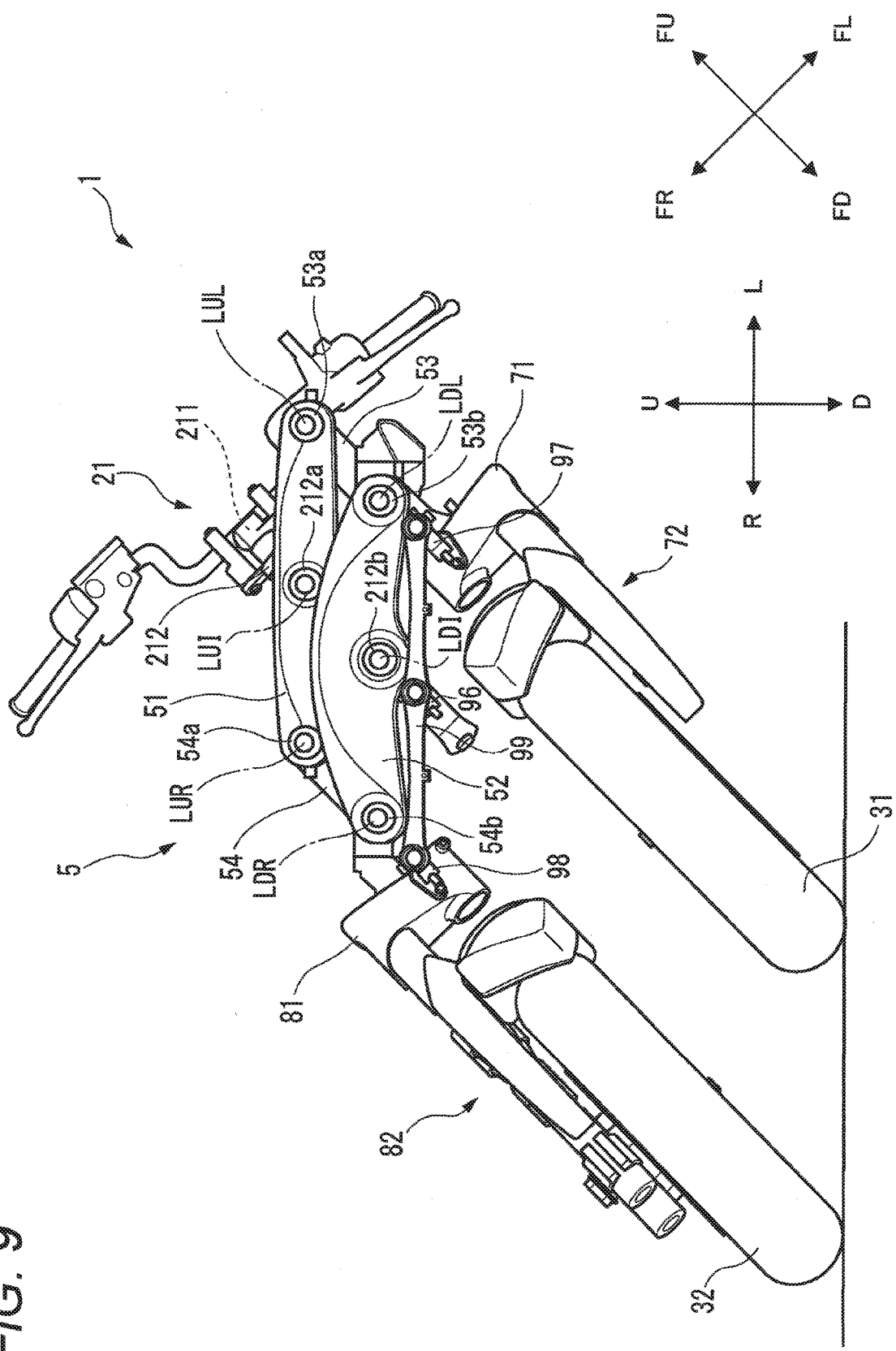
FIG. 9 is a front view illustrating the front portion of the leaning vehicle of FIG. 1 during leftward leaning.

For example, as illustrated in FIG. 9, when the rider causes the leaning vehicle 1 to lean to the left, the head pipe 211 and the link support 212 lean to the left from the vertical direction. As the head pipe 211 and the link support 212 so lean, the upper cross member 51 turns counterclockwise about the upper intermediate leaning turning axis LUI that passes through the upper intermediate leaning bearing 212a relative to the link support 212 when viewed from the front of the leaning vehicle 1. Similarly, the lower cross member 52 turns counterclockwise about the lower intermediate leaning turning axis LDI that passes through the lower intermediate leaning bearing 212b relative to the head pipe 211 when viewed from the front of the leaning vehicle 1. This causes the upper cross member 51 to move to the left in the left-right direction of the body frame 21 relative to the lower cross member 52.

As a result of the upper cross member 51 moving as described above, the upper cross member 51 turns counterclockwise about the upper left leaning turning axis LUL that passes the upper left leaning bearing 53a and the upper right leaning turning axis LUR that passes through the upper right leaning bearing 54a relative to the left side member 53 and the right side member 54, respectively, when viewed from the front of the leaning vehicle 1. Similarly, the lower cross member 52 turns counterclockwise about the lower left leaning turning axis LDL that passes through the lower left leaning bearing 53b and the lower right leaning turning axis LDR that passes through the lower right leaning bearing 54b relative to the left side member 53 and the right side member 54, respectively, when viewed from the front of the leaning vehicle 1. As a result of the lower cross member 52 moving as described above, the left side member 53 and the right side member 54 lean to the left of the leaning vehicle 1 from the vertical direction while maintaining their postures that are parallel to the head pipe 211 and the link support 212.

As this occurs, the lower cross member 52 moves to the left in the left-right direction of the body frame 21 relative to the tie rod 99. As a result of the lower cross member 52 moving as described above, the intermediate coupling 991, the left coupling 992 and the right coupling 993 of the tie rod 99 turn relative to the intermediate joint 96, the left joint 97 and the right joint 98, respectively. This allows the tie rod 99 to hold a posture that is parallel to the upper cross member 51 and the lower cross member 52.

As the left side member 53 leans to the left of the leaning vehicle 1, the left bracket 71 that is supported on the left side member 53 via the left turnable member leans to the left of the leaning vehicle 1. As the left bracket 71 leans in this way, the left shock absorber 72 that is supported on the left bracket 71 also leans to the left of the leaning vehicle 1. As a result of the left shock absorber 72 leaning as described above, the left front wheel 31 that is supported on the left shock absorber 72 leans to the left of the leaning vehicle 1 while maintaining its posture that is parallel to the head pipe 211 and the link support 212.

As the right side member 54 leans to the left of the leaning vehicle 1, the right bracket 81 that is supported on the right side member 54 via the right turnable member leans to the left of the leaning vehicle 1. As the right bracket 81 leans in this way, the right shock absorber 82 that is supported on the right bracket 81 also leans to the left of the leaning vehicle 1. As a result of the right shock absorber 82 leaning as described above, the right front wheel 32 that is supported on the right shock absorber 82 leans to the left of the leaning vehicle 1 while maintaining its posture that is parallel to the head pipe 211 and the link support 212.

The leaning actions of the left front wheel 31 and the right front wheel 32 are described based on the vertical direction. However, when the leaning vehicle 1 is operated to lean (when the linkage 5 is activated to operate), the up-down direction of the body frame 21 does not coincide with the vertical direction. When the up-down direction of the body frame 21 is taken as the reference, when the linkage 5 is activated to operate, the left front wheel 31 and the right front wheel 32 change their relative position in the up-down direction of the body frame 21. In other words, the linkage 5 changes the relative position of the left front wheel 31 and the right front wheel 32 in the up-down direction of the body frame 21 to cause the body frame 21 to lean to the left or right of the leaning vehicle 1 from the vertical direction.

When the rider causes the leaning vehicle 1 to lean to the right, the elements lean to the right. Since the elements merely move reversely in relation to the left-right direction, a detailed description of the reverse movement of the elements will be omitted here.

Figure 10:
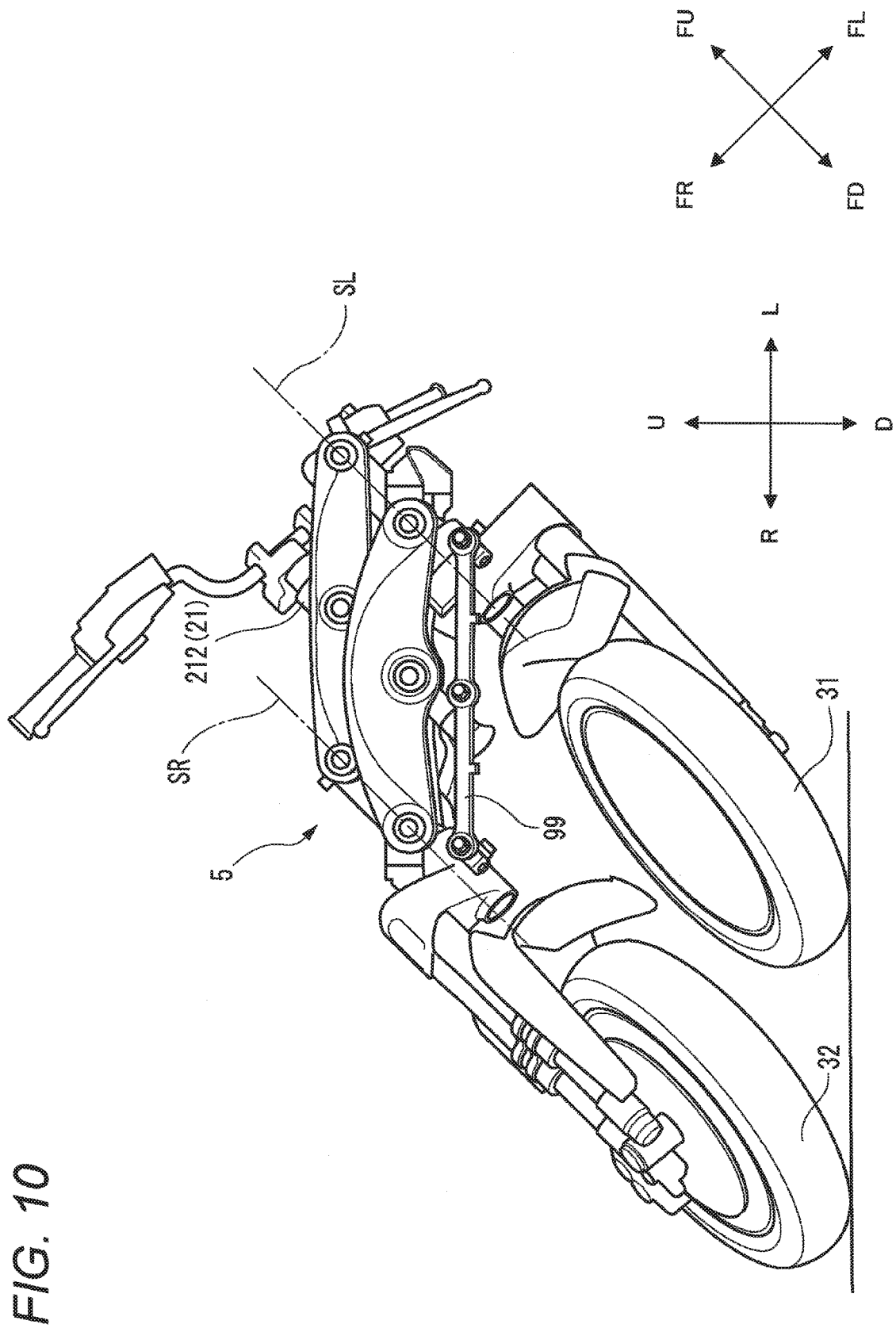
FIG. 10 is a front view illustrating the front portion of the leaning vehicle of FIG. 1 during steering and leftward leaning.

FIG. 10 is a front view of the front portion of the leaning vehicle 1 resulting when the leaning vehicle 1 is viewed from the front in the front-rear direction of the body frame 21, which shows a state in which the leaning vehicle 1 is caused to lean while the front wheels thereof are being turned. FIG. 10 shows a state in which the front wheels are turned to the left while the leaning vehicle 1 is leaning to the left. In FIG. 10, the front cover 221 is omitted from illustration.

When the front wheels are turned, the left front wheel 31 is turned counterclockwise about the left steering turning axis SL, while the right front wheel 32 is turned counterclockwise about the right steering turning axis SR. When the rider causes the leaning vehicle 1 to lean, the left front wheel 31 and the right front wheel 32 lean to the left of the leaning vehicle 1 together with the body frame 21. Namely, in this state, the linkage 5 exhibits the shape of a parallelogram. The tie rod 99 moves to the left in the left-right direction of the body frame 21 and to the rear in the front-rear direction of the body frame 21 from the position that the tie rod 99 takes when the body frame 21 is standing upright.

Next, a configuration will be described which significantly reduces or prevents an inconsistency in posture between the left front wheel 31 and the right front wheel 32 which occurs when the leaning vehicle 1 which includes the leanable body frame 21 and the two front wheels 3 turns.

As described above, the left front wheel 31 and the right front wheel 32 are arranged side by side in the left-right direction of the body frame 21. The linkage 5 changes the relative positions of the left front wheel 31 and the right front wheel 32 to the body frame 21 to cause the body frame 21 to lean to the left or right of the leaning vehicle 1.

As illustrated in FIG. 6, the leaning vehicle 1 includes the front intermediate steering bearing 212c (an example of a first intermediate steering bearing). The front intermediate steering bearing 212c defines and functions as the front intermediate steering turning axis SIF (an example of a first intermediate steering turning axis) that extends in the up-down direction of the body frame 21.

As illustrated in FIG. 5, the leaning vehicle 1 includes the left steering bearing 53c (an example of a first left steering bearing). The left steering bearing 53c is disposed on the left of the front intermediate steering bearing 212c. The left steering bearing 53c defines and functions as the left steering turning axis SL (an example of a first left steering turning axis) that extends in the up-down direction of the body frame 21.

As illustrated in FIG. 5, the leaning vehicle 1 includes the right steering bearing 54c (an example of a first right steering bearing). The right steering bearing 54c is disposed on the right of the front intermediate steering bearing 212c. The right steering bearing 54c defines and functions as the right steering turning axis SR (an example of a first right steering turning axis) that extends in the up-down direction of the body frame 21.

The left suspension 7 is coupled to the left steering bearing 53c. The left suspension 7 supports the left front wheel 31. The right suspension 8 is coupled to the right steering bearing 54c. The right suspension 8 supports the right front wheel 32.

The steering member 6 turns relative to the body frame 21. As the steering member 6 turns from its neutral position, the steering force transmission 9 turns the left suspension 7 about the left steering turning axis SL in the direction in which the steering member 6 so turns and the right suspension 8 about the right steering turning axis SR in the direction in which the steering member 6 so turns.

As illustrated in FIG. 3, the linkage 5 includes a lower intermediate leaning bearing 212b (an example of a first intermediate leaning bearing), a lower left leaning bearing 53b (an example of a first left leaning bearing), and a lower right leaning bearing 54b (an example of a first right leaning bearing).

The lower intermediate leaning bearing 212b defines and functions as a lower intermediate leaning turning axis LDI (an example of a first intermediate leaning turning axis) that extends in the front-rear direction of the body frame 21.

The lower left leaning bearing 53b is disposed on the left of the lower intermediate leaning bearing 212b. The lower left leaning bearing 53b defines and functions as a lower left leaning turning axis LDL (an example of a first left leaning turning axis) that extends in the front-rear direction of the body frame 21.

The lower right leaning bearing 54b is disposed on the right of the lower intermediate leaning bearing 212b. The lower right leaning bearing 54b defines and functions as a lower right leaning turning axis LDR (an example of a first right leaning turning axis) that extends in the front-rear direction of the body frame 21.

The lower cross member 52 (an example of a leaning turnable member) of the linkage 5 is coupled to the lower intermediate leaning bearing 212b so as to turn about the lower intermediate leaning turning axis LDI. The left portion of the lower cross member 52 is coupled to the lower left leaning bearing 53b so as to turn about the lower left leaning turning axis LDL. The right portion of the lower cross member 52 is coupled to the lower right leaning bearing 54b so as to turn about the lower right leaning turning axis LDR.

When the lower left leaning bearing 53b is displaced relative to the body frame 21 as the body frame 21 leans, the left suspension 7 is displaced relative to the right suspension 8 while changing its posture relative to the lower cross member 52. Similarly, when the lower right leaning bearing 54b is displaced relative to the body frame 21 as the body frame 21 leans, the right suspension 8 is displaced relative to the left suspension 7 while changing its posture relative to the lower cross member 52.

As described above, the steering force transmission 9 includes the downstream-side steering 91, the intermediate transmission plate 93, the left transmission plate 94, the right transmission plate 95, the intermediate joint 96, the left joint 97, the right joint 98 and the tie rod 99.

The downstream-side steering shaft 91 (an example of a steering turnable member) is coupled to the front intermediate steering bearing 212c. As the steering member 6 turns, the downstream-side steering shaft 91 turns about the front intermediate steering turning axis SIF in the direction in which the steering member 6 so turns.

The intermediate transmission plate 93, the left transmission plate 94, the right transmission plate 95, the intermediate joint 96, the left joint 97, the right joint 98 and the tie rod 99 define an example of a transmission member, and a turning force of the downstream-side steering shaft 91 is transmitted to the left suspension 7 and the right suspension 8.

As illustrated in FIG. 7, the steering force transmission 9 includes an intermediate joint steering bearing 961, an intermediate joint leaning bearing 962, a left joint steering bearing 971, a left joint leaning bearing 972, a right joint steering bearing 981 and a right joint leaning bearing 982.

The intermediate joint steering bearing 961 (an example of a second intermediate steering bearing) defines and functions as an intermediate joint steering turning axis SIJ (an example of a second intermediate steering turning axis) that extends in the up-down direction of the body frame 21.

The left joint steering bearing 971 (an example of a second left steering bearing) is disposed on the left of the intermediate joint steering bearing 961. The left joint steering bearing 971 defines and functions as a left joint steering turning axis SLJ (an example of a second left steering turning axis) that extends in the up-down direction of the body frame 21.

The right joint steering bearing 981 (an example of a second right steering bearing) is disposed on the right of the intermediate joint steering bearing 961. The right joint steering bearing 981 defines and functions as a right joint steering turning axis SRJ (an example of a second right steering turning axis) that extends in the up-down direction of the body frame 21.

The intermediate joint leaning bearing 962 (an example of a second intermediate leaning bearing) defines and functions as an intermediate joint leaning turning axis LIJ (an example of a second intermediate leaning turning axis) that extends in the front-rear direction of the body frame 21.

The left joint leaning bearing 972 (an example of a second left leaning bearing) is disposed on the left of the intermediate joint leaning bearing 962. The left joint leaning bearing 972 defines and functions as a left joint leaning turning axis LLJ (an example of a second left leaning turning axis) that extends in the front-rear direction of the body frame 21.

The right joint leaning bearing 982 (an example of a second right leaning bearing) is disposed on the right of the intermediate joint leaning bearing 962. The right joint leaning bearing 982 defines and functions as a right joint leaning turning axis LRJ (an example of a second right leaning turning axis) that extends in the front-rear direction of the body frame 21.

The intermediate coupling 991 of the tie rod 99 is coupled to the downstream-side steering shaft 91 via the intermediate joint 96 and the intermediate transmission plate 93. The intermediate coupling 991 of the tie rod 99 is able to turn about the intermediate joint leaning turning axis LIJ and the intermediate joint steering turning axis SIJ.

The left coupling 992 of the tie rod 99 is coupled to the left suspension 7 via the left joint 97 and the left transmission plate 94. The left coupling 992 of the tie rod 99 is able to turn about the left joint leaning turning axis LLJ and the left joint steering turning axis SLJ.

The right coupling 993 of the tie rod 99 is coupled to the right suspension 8 via the right joint 98 and the right transmission plate 95. The right coupling 993 of the tie rod 99 is able to turn about the right joint leaning turning axis LRJ and the right joint steering turning axis SRJ.

As illustrated in FIG. 3, when viewing the leaning vehicle 1 in which the body frame 21 is standing upright and the steering member 6 is in its neutral position from the front thereof, inclination angles of the left steering turning axis SL and the right steering turning axis SR from the vertical direction are both substantially zero.

Figure 11:
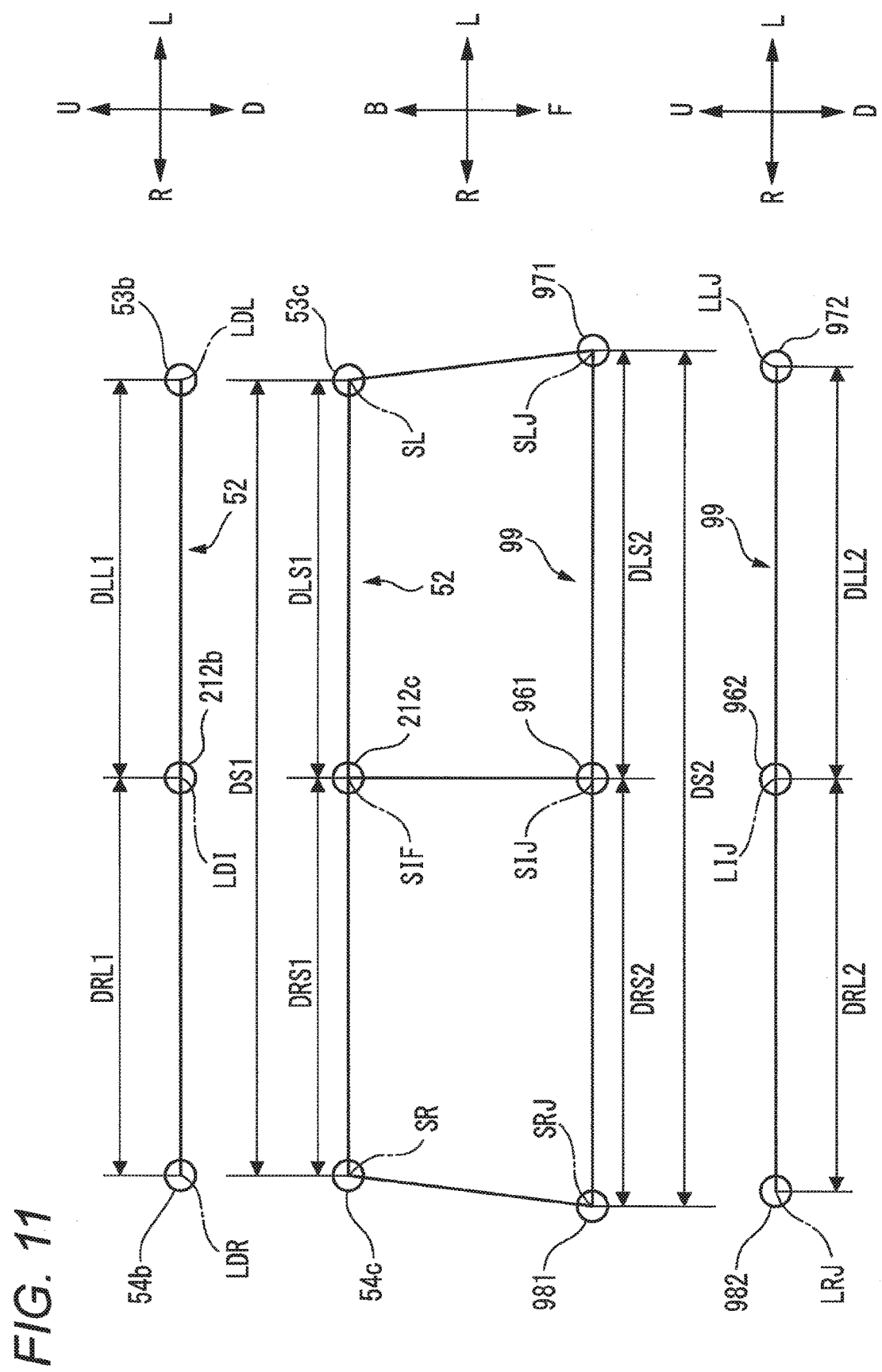
FIG. 11 is a diagram illustrating a structure that significantly reduces or prevents an inconsistency in posture between a left front wheel and a right front wheel that is caused when the leaning vehicle of FIG. 1 turns.

As illustrated in FIG. 11, in this preferred embodiment, a first steering inter-axis distance DS1 between the left steering bearing 53c and the right steering bearing 54c differs from a second steering inter-axis distance DS2 between the left joint steering bearing 971 and the right joint steering bearing 981. Namely, the leaning vehicle 1 according to this preferred embodiment uses the so-called Ackermann steering geometry.

In the following description, an "inter-axis distance" is defined as a length of a straight line which connects central positions of bearings which are on turning axes defined by the bearings and in relation to directions which follow the turning axes. For example, in the case of the first steering inter-axis distance DS1, the distance DS1 is defined as a length of a straight line which connects a central position (denoted by reference character C in FIG. 5) of the left steering bearing 53c which is on the left steering turning axis SL and in relation to a direction which follows the left steering turning axis SL and a central position of the right steering bearing 54c which is on the right steering turning axis SR and in relation to a direction which follows the right steering turning axis SR.

When a plurality of bearings exist along one of two rotating shaft turning axes, the "inter-axis distance" is defined so as to satisfy the requirements in relation to the straight line which connects the central positions together between one bearing that is selected arbitrarily from the plurality of bearings that define the one turning axis and a bearing that defines and functions as the other turning axis.

When a plurality of bearings are located along each of two rotating shaft turning axes, the "inter-axis distance" is defined so as to satisfy the requirements in relation to the straight line which connects the central positions together between one bearing that is selected arbitrarily from the plurality of bearings that define the one turning axis and a bearing that is selected arbitrarily from the plurality of bearings that define the other turning axis.

As illustrated in FIG. 11, in the leaning vehicle 1 according to this preferred embodiment, a difference (an absolute value of DLL1-DLL2) between a first left leaning inter-axis distance DLL1 and a second left leaning inter-axis distance DLL2 is smaller than a difference (an absolute value of DLS1-DLS2) between a first left steering inter-axis distance DLS1 and a second left steering inter-axis distance DLS2.

The first left leaning inter-axis distance DLL1 is defined as an inter-axis distance between the lower intermediate leaning bearing 212b and the lower left leaning bearing 53b. The second left leaning inter-axis distance DLL2 is defined as an inter-axis distance between the intermediate joint leaning bearing 962 and the left joint leaning bearing 972.

The first left steering inter-axis distance DLS1 is defined as an inter-axis distance between the front intermediate steering bearing 212c and the left steering bearing 53c. The second left steering inter-axis distance DLS2 is defined as an inter-axis distance between the intermediate joint steering bearing 961 and the left joint steering shaft bearing 971.

As illustrated in FIG. 11, in the leaning vehicle 1 according to this preferred embodiment, a difference (an absolute value of DRL1-DRL2) between a first right leaning inter-axis distance DRL1 and a second right leaning inter-axis distance DRL2 is smaller than a difference (an absolute value of DRS1-DRS2) between a first right steering inter-axis distance DRS1 and a second right steering inter-axis distance DRS2.

The first right leaning inter-axis distance DRL1 is defined as an inter-axis distance between the lower intermediate leaning bearing 212b and the lower right leaning bearing

54b. The second right leaning inter-axis distance DRL2 is defined as an inter-axis distance between the intermediate joint leaning bearing 962 and the right joint leaning bearing 982.

The first right steering inter-axis distance DRS1 is defined as an inter-axis distance between the front intermediate steering bearing 212c and the right steering bearing 54c. The second right steering inter-axis distance DRS2 is defined as an inter-axis distance between the intermediate joint steering bearing 961 and the right joint steering shaft bearing 981.

The inventors of preferred embodiments of the present application have discovered that in the leaning vehicle described in Japanese Patent Publication No. 2005-313876A, the difference between a turning angle of a member corresponding to the tie rod and a turning angle of a member corresponding to the lower cross member when the body frame leans causes the phenomenon in which the toe angles of the left and right front wheels change as the body frame leans.

The leaning vehicle described in Japanese Patent Publication No. 2005-313876A uses the so-called Ackermann steering geometry. Namely, in such a state that the body frame is standing upright and the steering member is in the neutral position thereof, a dimension corresponding to the first steering inter-axis distance DS1 and a dimension corresponding to the second steering inter-axis distance DS2 differ from each other. Additionally, in the leaning vehicle described in Japanese Patent Publication No. 2005-313876A, a difference between a dimension corresponding to the first left leaning inter-axis distance DLL1 and a dimension corresponding to the second left leaning inter-axis distance DLL2 coincides with a difference between a dimension corresponding to the first left steering inter-axis distance DLS1 and a dimension corresponding to the second left steering inter-axis distance DLS2. Similarly, a difference between a dimension corresponding to the first right leaning inter-axis distance DRL1 and a dimension corresponding to the second right leaning inter-axis distance DRL2 coincides with a difference between a dimension corresponding to the first right steering inter-axis distance DRS1 and a dimension corresponding to the second right steering inter-axis distance DRS2. The inventors of preferred embodiments of the present application have discovered that this structure causes a difference between a turning angle of a member corresponding to the transmission member and a turning angle of a member corresponding to the leaning turnable member as the body frame leans.

The inventors of preferred embodiments of the present application have discovered that an amount of change in toe angle of the left front wheel 31 that is caused as the body frame 21 leans is able to be reduced by making a difference between the first left leaning inter-axis distance DLL1 and the second left leaning inter-axis distance DLL2 smaller than a difference between the first left steering inter-axis distance DLS1 and the second left steering inter-axis distance DLS2 on the premise of using the Ackermann steering geometry. Similarly, the inventors of preferred embodiment of the present invention have discovered that an amount of change in toe angle of the right front wheel 32 that is caused as the body frame 21 leans is able to be reduced by making a difference between the first right leaning inter-axis distance DRL1 and the second right leaning inter-axis distance DRL2 smaller than a difference between the first right steering inter-axis distance DRS1 and the second right steering inter-axis distance DRS2. Namely, according to the structure described above, the amounts of change in toe angles of the two front wheels resulting when the leaning vehicle 1 turns are reduced.

On the other hand, when viewing the leaning vehicle 1, which is standing upright without being steered, from the front thereof, inclination angles of the left steering turning axis SL and the right steering turning axis SR from the vertical direction are both substantially zero. Consequently, the difference between a leaning angle of the left front wheel 31 and a leaning angle of the right front wheel 32 when the body frame 21 is caused to lean is significantly reduced or prevented.

It is possible to significantly reduce or prevent the occurrence of an inconsistency in posture between the left front wheel 31 and the right front wheel 32 when the leaning vehicle 1 including the leanable body frame 21 and the two front wheels 3 turns by the synergy between the reduction in the amount of change in toe angle and the suppression of the difference in leaning angle.

As illustrated in FIGS. 7 and 11, in this preferred embodiment, when viewing the leaning vehicle 1 from the front thereof, the left joint steering bearing 971 and the left joint leaning bearing 972 are offset from each other in the left-right direction of the body frame 21, such that the difference between the first left leaning inter-axis distance DLL1 and the second left leaning inter-axis distance DLL2 is smaller than the difference between the first left steering inter-axis distance DLS1 and the second left steering inter-axis distance DLS2.

Similarly, when viewing the leaning vehicle 1 from the front thereof, the right joint steering bearing 981 and the right joint leaning bearing 982 are offset from each other in the left-right direction of the body frame 21, such that the difference between the first right leaning inter-axis distance DRL1 and the second right leaning inter-axis distance DRL2 is smaller than the difference between the first right steering inter-axis distance DRS1 and the second right steering inter-axis distance DRS2.

A size of the left joint 97 which defines and functions as a transmission member is smaller than those of the linkage 5 and the left suspension 7. Because of this, the arrangement of the left joint steering bearing 971 and the left joint leaning bearing 972 is changed relatively easily so that the difference between the first left leaning inter-axis distance DLL1 and the second left leaning inter-axis distance DLL2 is smaller than the difference between the first left steering inter-axis distance DLS1 and the second left steering inter-axis distance DLS2, while satisfying the required rigidity.

Similarly, a size of the right joint 98 which defines and functions as a transmission member is smaller than those of the linkage 5 and the right suspension 8. Because of this, the arrangement of the right joint steering bearing 981 and the right joint leaning bearing 982 is changed relatively easily so that the difference between the first right leaning inter-axis distance DRL1 and the second right leaning inter-axis distance DRL2 is smaller than the difference between the first right steering inter-axis distance DRS1 and the second right steering inter-axis distance DRS2, while satisfying the required rigidity.

Consequently, it is possible to significantly reduce or prevent the inconsistency in posture between the left front wheel 31 and the right front wheel 32, which occurs when the leaning vehicle 1 turns more easily, than when changing the arrangement of the linkage 5, the left suspension 7 and the right suspension 8 to obtain the relationship between the inter-axis distances described above.

However, the lower left leaning bearing 53b and the left steering bearing 53c may be offset from each other in the left-right direction of the body frame 21 when viewing the leaning vehicle 1 from the front thereof, such that a difference between the first left leaning inter-axis distance DLL1 and the second left leaning inter-axis distance DLL2 is smaller than a difference between the first left steering inter-axis distance DLS1 and the second left steering inter-axis distance DLS2.

Similarly, the lower right leaning bearing 54b and the right steering bearing 54c may be offset from each other in the left-right direction of the body frame 21 when viewing the leaning vehicle 1 from the front thereof, such that a difference between the first right leaning inter-axis distance DRL1 and the second right leaning inter-axis distance DRL2 is smaller than a difference between the first right steering inter-axis distance DRS1 and the second right steering inter-axis distance DRS2.

In order to offset the lower intermediate leaning bearing 212b and the front intermediate steering bearing 212c from each other in the left-right direction of the body frame 21 when viewing the leaning vehicle 1 from the front thereof, it is preferable to provide two leaning bearings which function similarly to the lower intermediate leaning bearing 212b and also preferable to provide two lower cross members which turn about the leaning bearings so provided. Similarly, in order to offset the intermediate joint steering bearing 961 and the intermediate joint leaning bearing 962 from each other in the left-right direction of the body frame 21 when viewing the leaning vehicle 1 from the front thereof, it is preferable to provide two leaning bearings which function similarly to the intermediate joint leaning bearing 962 and also preferable to provide two tie rods which turn about the leaning bearings so provided. By using the structures described above, it is not preferable to provide the two lower cross members and the tie rod. Because of this, it is possible to significantly reduce or prevent the inconsistency in posture between the left front wheel 31 and the right front wheel 32 which is caused when the leaning vehicle 1 turns by the use of a simpler construction.

Figure 12:
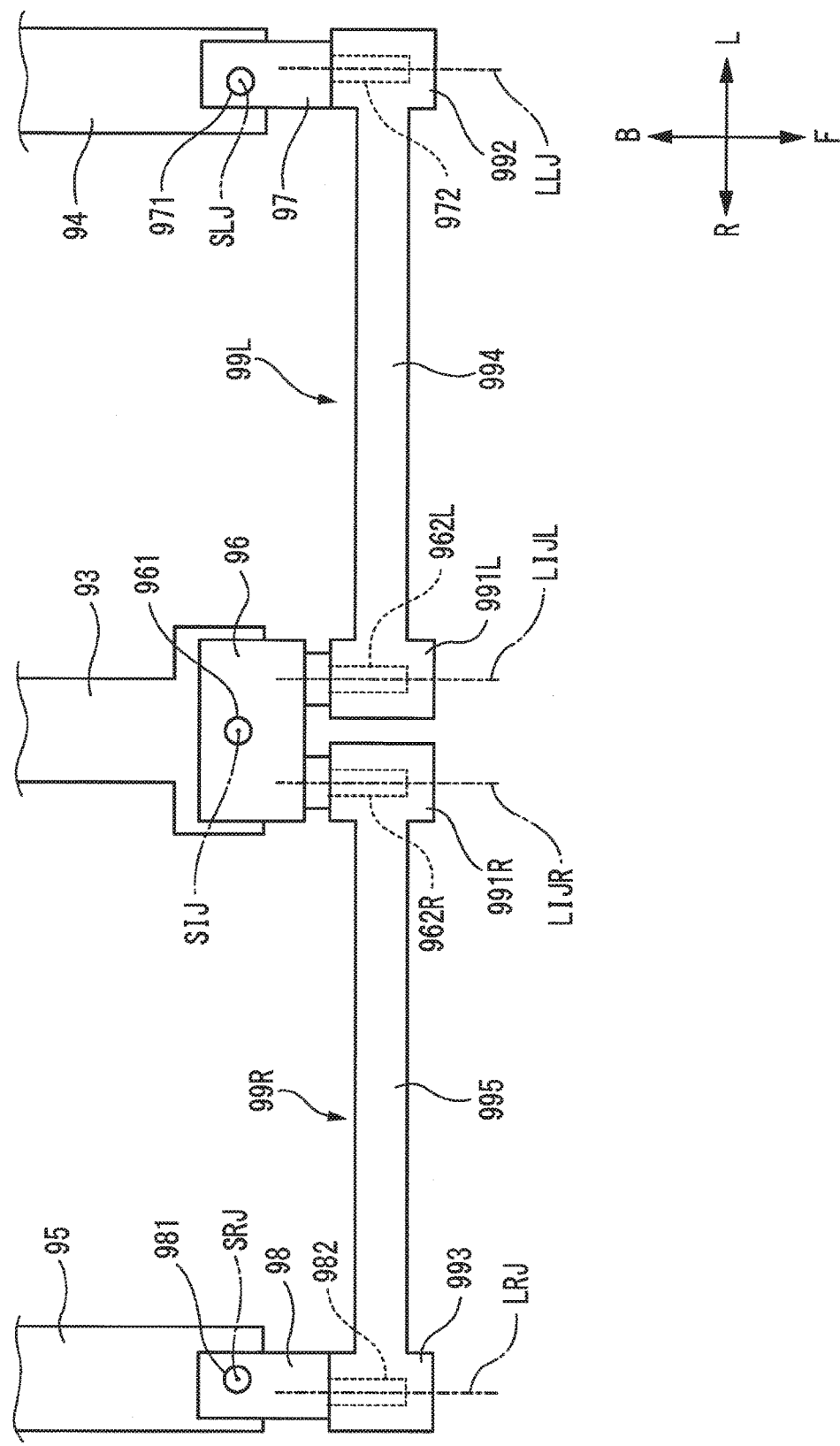
FIG. 12 is a plan view illustrating a steering force transmission according to a first modified preferred embodiment of the present invention.

However, the relationship between the inter-axis distances described above may be obtained by separating the lower cross member 52 or the tie rod 99 into two members. FIG. 12 shows schematically a first modified preferred embodiment in which a tie rod 99 is separated into two members. Like reference numerals will be given to like or equal elements to those of the preferred embodiments described above so as to avoid a repetition of a similar description.

Specifically, a steering force transmission 9 includes a left tie rod 99L (an example of a left transmission member) and a right tie rod 99R (an example of a right transmission member).

The left tie rod 99L includes a left-intermediate coupling 991L, a left coupling 992 and a left arm portion 994. The left arm portion 994 connects the left-intermediate coupling 991L and the left coupling 992 together. The left-intermediate coupling 991L is coupled to an intermediate joint 96 via a left-intermediate joint leaning bearing 962L. By using this structure, the left-intermediate coupling 991L is able to turn about a left-intermediate joint leaning turning axis LIJL relative to the intermediate joint 96.

The right tie rod 99R includes a right-intermediate coupling 991R, a right coupling 993 and a right arm portion 995. The right arm portion 995 connects the right-intermediate coupling 991R and the right coupling 993 together. The right-intermediate coupling 991R is coupled to the intermediate joint 96 via a right-intermediate joint leaning bearing 962R. By using this structure, the right-intermediate coupling 991R is able to turn about a right-intermediate joint leaning turning axis LIJR relative to the intermediate joint 96.

Figure 13:
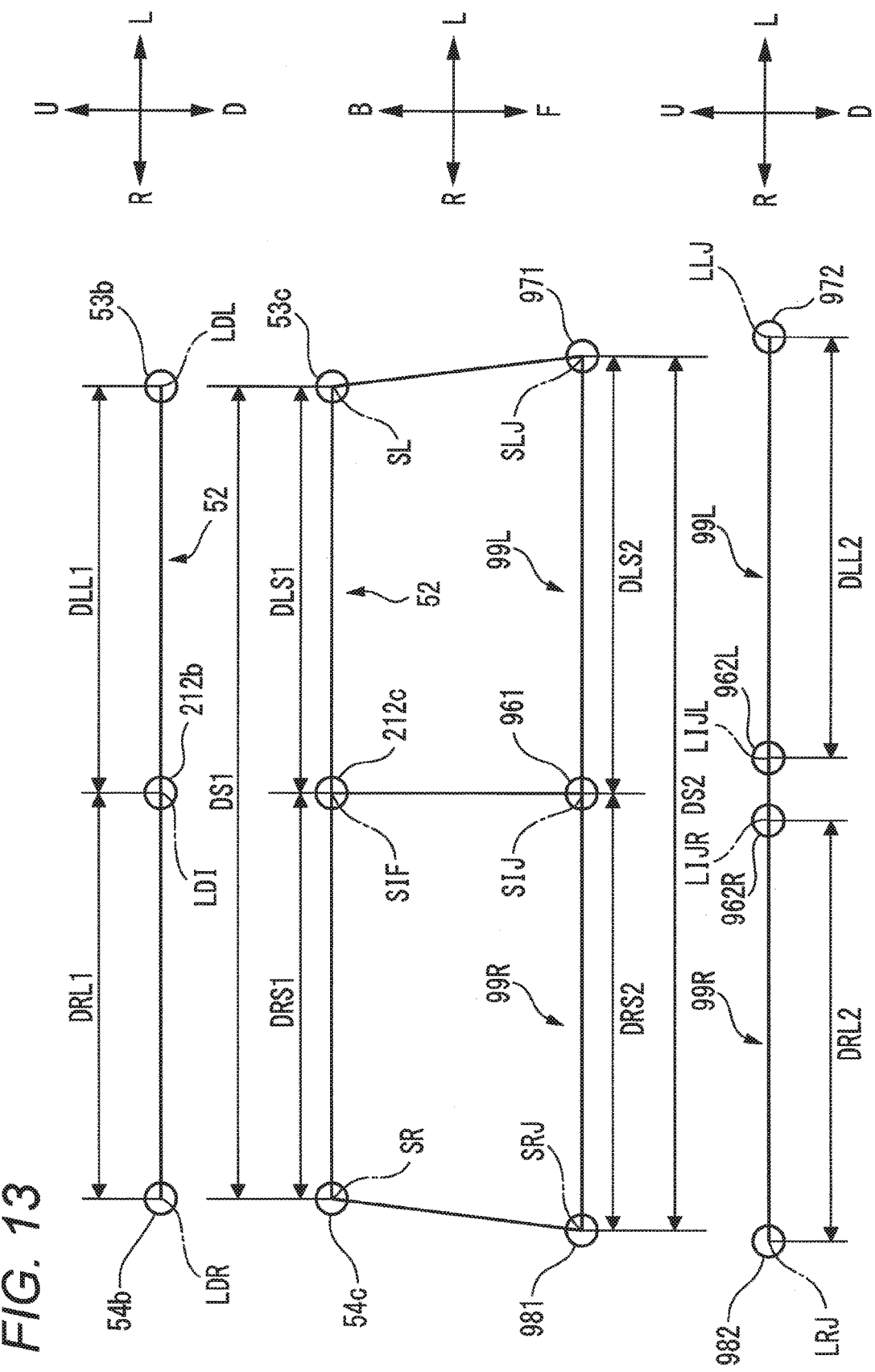
FIG. 13 is a diagram illustrating a structure that significantly reduces or prevents an inconsistency in posture between a left front wheel and a right front wheel that is caused when a leaning vehicle according to the first modified preferred embodiment of the present invention turns.

As illustrated in FIG. 13, also in this modified preferred embodiment, a first steering inter-axis distance DS1 between a left steering bearing 53c and a right steering bearing 54c differs from a second steering inter-axis distance DS2 between a left joint steering bearing 971 and a right joint steering bearing 981.

Also in this modified preferred embodiment, a difference (an absolute value of DLL1-DLL2) between a first left leaning inter-axis distance DLL1 and a second left leaning inter-axis distance DLL2 is smaller than a difference (an absolute value of DLS1-DLS2) between a first left steering inter-axis distance DLS1 and a second left steering inter-axis distance DLS2.

In this modified preferred embodiment, the second left leaning inter-axis distance DLL2 is defined as an inter-axis distance between the left-intermediate joint leaning bearing 962L and a left joint leaning bearing 972. Similarly, the second left steering inter-axis distance DLS2 is defined as an inter-axis distance between the intermediate joint steering bearing 961 and a left joint steering shaft bearing 971.

Similarly, also in this modified preferred embodiment, a difference (an absolute value of DRL1-DRL2) between a first right leaning inter-axis distance DRL1 and a second right leaning inter-axis distance DRL2 is smaller than a difference (an absolute value of DRS1-DRS2) between a first right steering inter-axis distance DRS1 and a second right steering inter-axis distance DRS2.

In this modified preferred embodiment, the second right leaning inter-axis distance DRL2 is defined as an inter-axis distance between the right-intermediate joint leaning bearing 962R and a right joint leaning bearing 982. Similarly, the second right steering inter-axis distance DRS2 is defined as an inter-axis distance between the right-intermediate joint steering bearing 961R and the right joint steering bearing 981.

With such a structure, it is also possible to significantly reduce or prevent an inconsistency in posture between the left front wheel 31 and the right front wheel 32 that is caused when the leaning vehicle 1 including the leanable body frame 21 and the two front wheels 3 turns.

The preferred embodiments described heretofore are intended to facilitate the understanding of the disclosed concepts and are not intended to limit the disclosed concepts. The disclosed contents can be modified or improved without departing from the disclosed concepts.

In the preferred embodiments described above, the tie rod 99 is preferably disposed ahead of the lower cross member 52 in the front-rear direction of the body frame 21. However, the tie rod 99 can be disposed behind the lower cross member 52 in the front-rear direction of the body frame 21.

Figure 14:
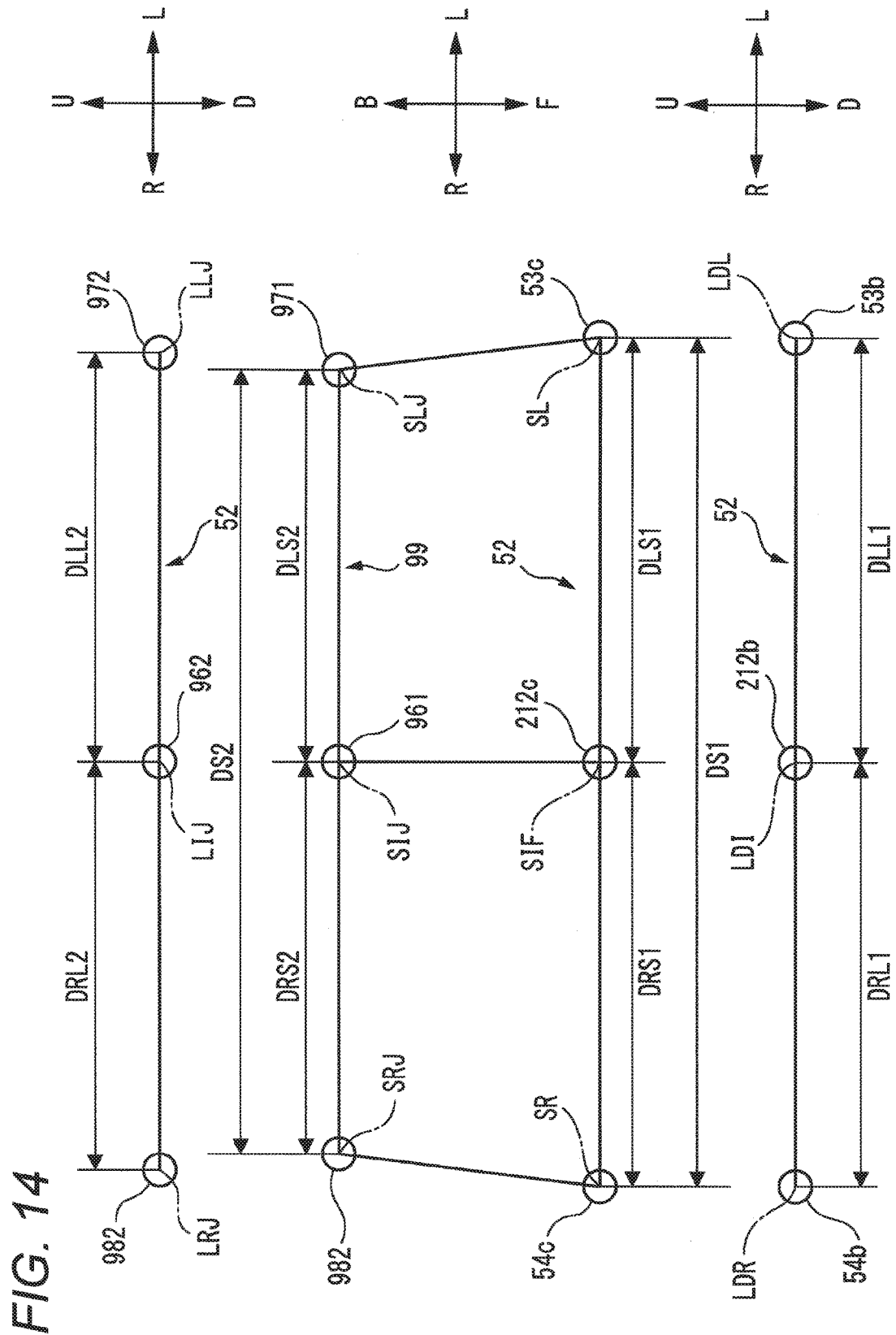
FIG. 14 is a diagram illustrating a structure that significantly reduces or prevents an inconsistency in posture between a left front wheel and a right front wheel that is caused when a leaning vehicle according to a second modified preferred embodiment of the present invention turns.

FIG. 14 is a diagram illustrating a second modified preferred embodiment of the present invention including such an arrangement to significantly reduce or prevent an inconsistency in posture between the left front wheel 31 and the right front wheel 32 that is caused when the leaning vehicle 1 turns. Like reference numerals will be given to like elements to those of the preferred embodiment disclosed in FIG. 11 so as to avoid a repetition of a similar description.

Also in this modified preferred embodiment, a first steering inter-axis distance DS1 between a left steering bearing 53c and a right steering bearing 54c differs from a second steering inter-axis distance DS2 between a left joint steering bearing 971 and a right joint steering bearing 981.

Also in this modified preferred embodiment, a difference (an absolute value of DLL1-DLL2) between a first left leaning inter-axis distance DLL1 and a second left leaning inter-axis distance DLL2 is smaller than a difference (an absolute value of DLS1-DLS2) between a first left steering inter-axis distance DLS1 and a second left steering inter-axis distance DLS2.

Similarly, also in this modified preferred embodiment, a difference (an absolute value of DRL1-DRL2) between a first right leaning inter-axis distance DRL1 and a second right leaning inter-axis distance DRL2 is smaller than a difference (an absolute value of DRS1-DRS2) between a first right steering inter-axis distance DRS1 and a second right steering inter-axis distance DRS2.

With such a structure, it is also possible to significantly reduce or prevent an inconsistency in posture between the left front wheel 31 and the right front wheel 32 that is caused when the leaning vehicle 1 including the leanable body frame 21 and the two front wheels 3 turns.

In the first modified preferred embodiment described by reference to FIGS. 12 and 13, the tie rod 99 is preferably disposed ahead of the lower cross member 52 in the front-rear direction of the body frame 21. However, the tie rod 99 can be disposed behind the lower cross member 52 in the front-rear direction of the body frame 21.

Figure 15:
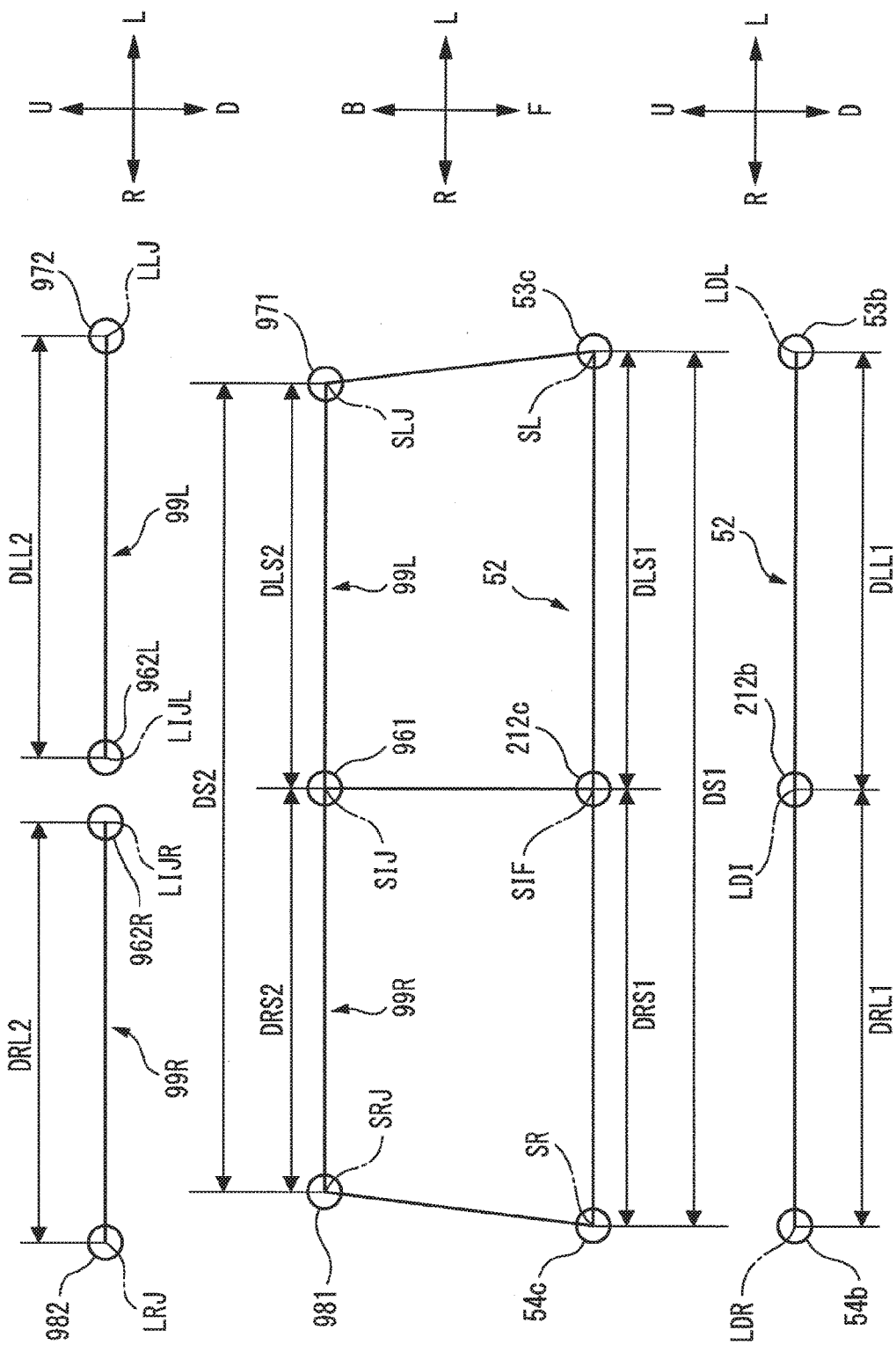
FIG. 15 is a diagram illustrating a structure that significantly reduces or prevents an inconsistency in posture between a left front wheel and a right front wheel that is caused when a leaning vehicle according to a third modified preferred embodiment of the present invention turns.

FIG. 15 is a diagram illustrating a third modified preferred embodiment of the present invention including an arrangement to significantly reduce or prevent an inconsistency in posture between the left front wheel 31 and the right front wheel 32 that is caused when the leaning vehicle 1 turns. Like reference numerals will be given to like elements to those of the first modified preferred embodiment described by reference to FIGS. 12 and 13 so as to avoid a repetition of a similar description.

Also in this modified preferred embodiment, a first steering inter-axis distance DS1 between a left steering bearing 53c and a right steering bearing 54c differs from a second steering inter-axis distance DS2 between a left joint steering bearing 971 and a right joint steering bearing 981.

Also in this modified preferred embodiment, a difference (an absolute value of DLL1-DLL2) between a first left leaning inter-axis distance DLL1 and a second left leaning inter-axis distance DLL2 is smaller than a difference (an absolute value of DLS1-DLS2) between a first left steering inter-axis distance DLS1 and a second left steering inter-axis distance DLS2.

Similarly, also in this modified preferred embodiment, a difference (an absolute value of DRL1-DRL2) between a first right leaning inter-axis distance DRL1 and a second right leaning inter-axis distance DRL2 is smaller than a difference (an absolute value of DRS1-DRS2) between a first right steering inter-axis distance DRS1 and a second right steering inter-axis distance DRS2.

With such a structure, it is also possible to significantly reduce or prevent an inconsistency in posture between the left front wheel 31 and the right front wheel 32 that is caused when the leaning vehicle 1 including the leanable body frame 21 and the two front wheels 3 turns.

In this modified preferred embodiment, when viewing the leaning vehicle 1 from the front thereof, a left-intermediate joint steering bearing 961L and a left-intermediate joint leaning bearing 962L are offset from each other in the left-right direction of the body frame 21, such that the difference between the first left leaning inter-axis distance DLL1 and the second left leaning inter-axis distance DLL2 is smaller than the difference between the first left steering inter-axis distance DLS1 and the second left steering inter-axis distance DLS2.

Similarly, when viewing the leaning vehicle 1 from the front thereof, a right-intermediate joint steering bearing 961R and a right-intermediate joint leaning bearing 962R are offset from each other in the left-right direction of the body frame 21, such that the difference between the first right leaning inter-axis distance DRL1 and the second right leaning inter-axis distance DRL2 is smaller than the difference between the first right steering inter-axis distance DRS1 and the second right steering inter-axis distance DRS2.

A size of a left-intermediate joint 96L which defines and functions as a transmission member is smaller than those of the linkage 5 and the left suspension 7. Because of this, even though the arrangement of a left-intermediate joint steering bearing 971L and a left-intermediate joint leaning bearing 972L is changed so that the difference between the first left leaning inter-axis distance DLL1 and the second left leaning inter-axis distance DLL2 becomes smaller than the difference between the first left steering inter-axis distance DLS1 and the second left steering inter-axis distance DLS2, an influence on a circumferential construction is small.

Similarly, a size of a right-intermediate joint 96R which defines and functions as a transmission member is smaller than those of the linkage 5 and the right suspension 8. Because of this, even though the arrangement of a right-intermediate joint steering bearing 961R and a right-intermediate joint leaning bearing 962R is changed so that the difference between the first right leaning inter-axis distance DRL1 and the second right leaning inter-axis distance DRL2 becomes smaller than the difference between the first right steering inter-axis distance DRS1 and the second right steering inter-axis distance DRS2, an influence on a circumferential construction is small.

Consequently, it is possible to significantly reduce or prevent an inconsistency in posture between the left front wheel 31 and the right front wheel 32 which occurs when the leaning vehicle 1 turns more easily than when changing the arrangement of the linkage 5, the left suspension 7 and the right suspension 8 to obtain the relationship between the inter-axis distances described above.

In the preferred embodiments and each of the modified preferred embodiments that have been described heretofore, the linkage 5 preferably includes the upper cross member 51, the lower cross member 52, the left side member 53 and the right side member 54. The lower cross member 52 is disposed below the upper cross member 51 in the up-down direction of the body frame 21. As illustrated in FIG. 5, the left side member 53 supports the left suspension 7 turnably via the pair of left steering bearings 53c. The right side member 54 supports the right suspension 8 turnably via the pair of right steering bearings 54c.

The upper cross member 51, the lower cross member 52, the left side member 53 and the right side member 54 are coupled together so that the upper cross member 51 and the lower cross member 52 keep postures that are parallel to each other and the left side member 53 and the right side member 54 keep postures that are parallel to each other.

In this case, the relationship between the inter-axis distances described by reference to FIG. 11 should be defined for at least one of the upper cross member 51 and the lower cross member 52. Namely, at least one of the upper cross member 51 and the lower cross member 52 defines and functions as the leaning turnable member.

In the preferred embodiments described above, the upper cross member 51 preferably includes a single plate-shaped member, while the lower cross member 52 preferably includes the front element 521 and the rear element 522. However, the upper cross member 51 may include a front element and a rear element.

Figure 16:
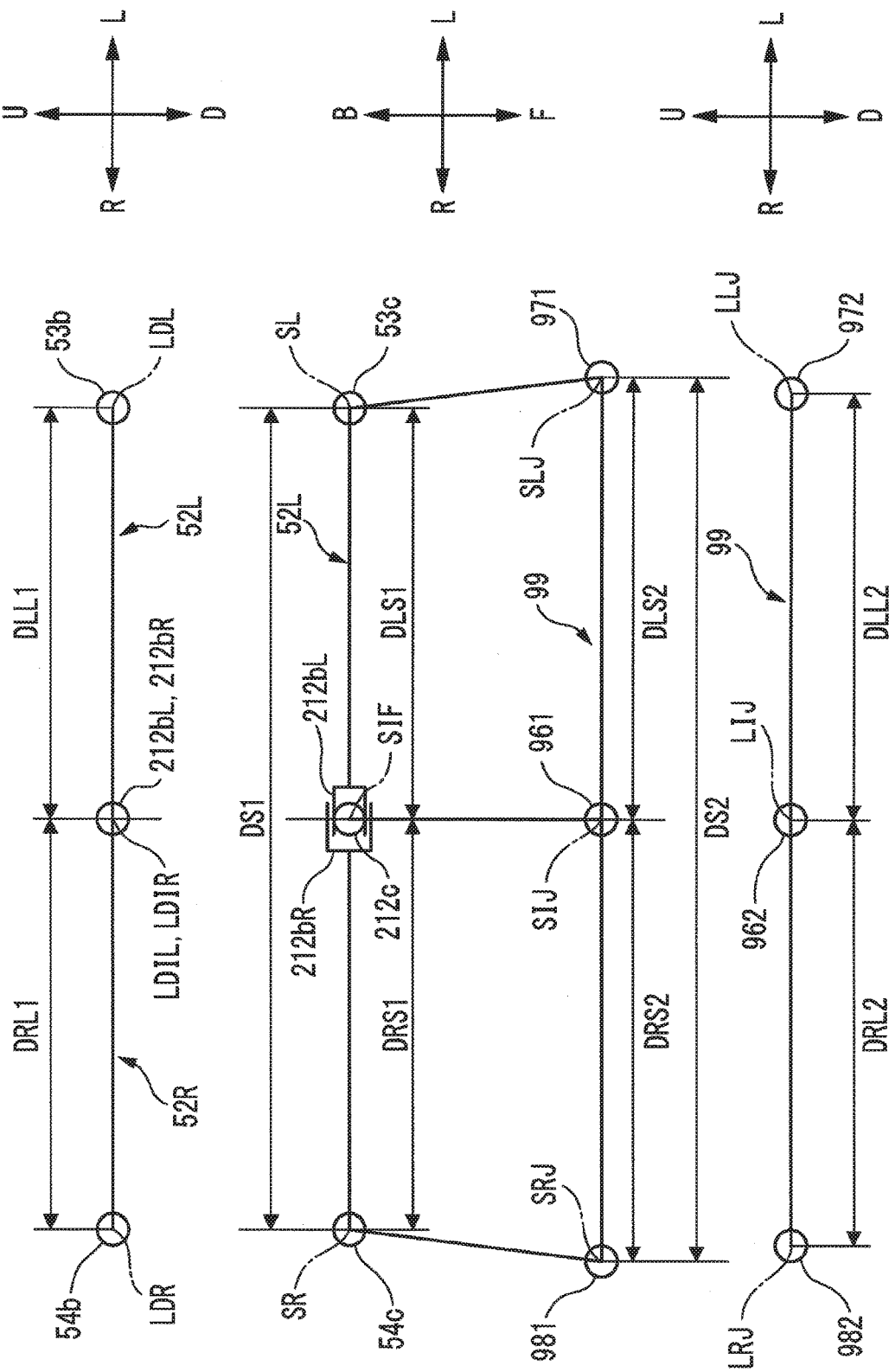
FIG. 16 is a diagram illustrating a structure that significantly reduces or prevents an inconsistency in posture between a left front wheel and a right front wheel that is caused when a leaning vehicle according to a fourth modified preferred embodiment of the present invention turns.

At least one of the upper cross member 51 and the lower cross member 52 may include a member that is supported on the link support 212 and the left side member 53 and a member that is supported on the link support 212 and the right side member 54. FIG. 16 shows schematically a fourth modified preferred embodiment of the present invention in which a lower cross member 52 is separated into two members. Like reference numerals will be given to like or equal elements to those of the preferred embodiments described above so as to avoid a repetition of a similar description.

In this modified preferred embodiment, the lower cross member 52 includes a left lower cross member 52L (an example of a left leaning turnable member) and a right lower cross member 52R (an example of a right leaning turnable member).

A link support 212 includes a left lower intermediate leaning bearing 212bL (an example of a first left-intermediate leaning bearing) and a right lower intermediate leaning bearing 212bR (an example of a first right-intermediate leaning bearing).

The left lower intermediate leaning bearing 212bL defines and functions as a left lower intermediate leaning turning axis LDIL that extends in the front-rear direction of the body frame 21. The left lower cross member 52L is coupled to the link support 212 via the left lower intermediate leaning bearing 212bL. By using this structure, the left lower cross member 52L is able to turn about the left lower intermediate leaning turning axis LDIL relative to the link support 212.

The right lower intermediate leaning bearing 212bR defines and functions as a right lower intermediate leaning turning axis LDIR that extends in the front-rear direction of the body frame 21. The right lower cross member 52R is coupled to the link support 212 via the right lower intermediate leaning bearing 212bR. By using this structure, the right lower cross member 52R is able to turn about the right lower intermediate leaning turning axis LDIR relative to the link support 212.

Also in this modified preferred embodiment, a first steering inter-axis distance DS1 between a left steering bearing 53c and a right steering bearing 54c differs from a second steering inter-axis distance DS2 between a left joint steering bearing 971 and a right joint steering bearing 981.

Also in this modified preferred embodiment, a difference (an absolute value of DLL1-DLL2) between a first left leaning inter-axis distance DLL1 and a second left leaning inter-axis distance DLL2 is smaller than a difference (an absolute value of DLS1-DLS2) between a first left steering inter-axis distance DLS1 and a second left steering inter-axis distance DLS2.

Similarly, also in this modified preferred embodiment, a difference (an absolute value of DRL1-DRL2) between a first right leaning inter-axis distance DRL1 and a second right leaning inter-axis distance DRL2 is smaller than a difference (an absolute value of DRS1-DRS2) between a first right steering inter-axis distance DRS1 and a second right steering inter-axis distance DRS2.

However, the first left leaning inter-axis distance DLL1 is defined as an inter-axis distance between the left lower intermediate leaning bearing 212bL and the lower left leaning bearing 53b. Similarly, the first right leaning inter-axis distance DRL1 is defined as an inter-axis distance between the right lower intermediate leaning bearing 212bR and the lower right leaning bearing 54b.

With such a structure, it is also possible to significantly reduce or prevent an inconsistency in posture between the left front wheel 31 and the right front wheel 32 that is caused when the leaning vehicle 1 including the leanable body frame 21 and the two front wheels 3 turns.

In this modified preferred embodiment, when viewing the leaning vehicle 1 from the front thereof, the left lower intermediate leaning turning axis LDIL preferably overlaps the right lower intermediate leaning turning axis LDIR. However, the left lower intermediate leaning turning axis LDIL and the right lower intermediate leaning turning axis LDIR can be disposed so as to be offset from each other in the left-right direction of the body frame 21, provided that the relationship between the inter-axis distances described above is satisfied.

The linkage 5 may include a cross member other than the upper cross member 51 and the lower cross member 52. The "upper cross member" and the "lower cross member" are merely so called based on their relative positional relationship in relation to the up-down direction. The "upper cross member" does not mean an uppermost cross member in the linkage 5. The "upper cross member" means a cross member that lies above another cross member. The "lower cross member" does not mean a lowermost cross member in the linkage 5. The "lower cross member" means a cross member that lies below another cross member.

In the above preferred embodiments and each of the modified preferred embodiments, the linkage 5 preferably includes the so-called parallel four joint link system. Namely, the upper cross member 51, the lower cross member 52, the left side member 53 and the right side member 54 are supported on the link support 212 so that the upper cross member 51 and the lower cross member 52 are kept in a posture in which the upper cross member 51 and the lower cross member 52 are parallel to each other and that the left side member 53 and the right side member 54 are kept in a posture in which the left side member 53 and the right side member 54 are parallel to each other. However, a so-called double wishbone-type linkage may be used, provided that the body frame 21 is able to lean to the left or right of the leaning vehicle 1 by changing the relative positions of the left front wheel 31 and the right front wheel 32 to the body frame 21.

All the bearings that are referred to in the description made heretofore are preferably cylindrical bearings, for example. In this case, the offset arrangements of the leaning axes and the steering axes are achieved less expensively than a case where spherical bearings are used. However, arbitrary known bearings may be used as the bearings.

The statement that the inclination angles of the left steering turning axis SL and the right steering turning axis SR from the vertical direction are both substantially zero includes not only a case where values of the inclination angles are actually zero but also a case where the inclination angles have values other than zero due to tolerances generated in fabricating the leaning vehicle.

In the case of the leaning vehicle 1 according to the preferred embodiments described above, although there are a number of factors generating fabrication tolerances, among them, three factors particularly contributing to the generation of such tolerances will be described as examples. Although a description will be made in relation to the left steering turning axis SL, what will be described below is also true with the right steering turning axis SR.

A tolerance in an inter-center distance between an upper intermediate hole and an upper left hole that are provided in the upper cross member 51 can be exemplified as a first factor. The upper intermediate hole holds the upper intermediate leaning bearing 212*a* of the link support 212. The upper left hole holds the upper left leaning bearing 53*a* of the left side member 53.

A tolerance in an inter-center distance between a lower intermediate hole and a lower left hole that are provided in the lower cross member 52 can be exemplified as a second factor. The lower intermediate hole holds the lower intermediate leaning bearing 212*b* of the link support 212. The lower left hole holds the lower left leaning bearing 53*b* of the left side member 53.

A tolerance of an inclination angle of a straight line that connects the upper left hole and the lower left hole from the vertical direction when viewing the leaning vehicle 1 in which the body frame 21 is standing upright from the front thereof is obtained based on the first factor and the second factor.

A tolerance of an inclination angle of a straight line that connects the upper left leaning turning axis LUL and the lower left leaning turning axis LDL from the left steering turning axis SL when viewing the leaning vehicle 1 in which the body frame 21 is standing upright from the front thereof is exemplified as a third factor.

Here, assuming that the straight line that connects the upper left hole and the lower left hole and the straight line that connects the upper left leaning turning axis LUL and the lower left leaning turning axis LDL are substantially the same, a tolerance of an inclination angle of the left steering turning axis SL from the vertical direction can be obtained.

Tolerance values of an ordinary class defined under the "JIS0405: Ordinary Tolerances" are used for calculation of specific numeric values (http://kikakurui.com/b0/B0405-1991-01.html). In JIS0405, various tolerance values are described in ascending order while being classified into accuracy class, medium class, coarse class and extremely coarse class. Here, tolerance values of the medium class are used which are considered to be most general.

It is appropriate to used values illustrated in Table 1 of "Lengthwise Dimensions and Ordinary Tolerances for Lengthwise Dimensions" under paragraph 1, Section 4 of JIS0405. Table 1 specifies tolerances for each reference dimension under the accuracy to extremely coarse classes. In an example of a preferred embodiment of the present invention, the reference dimension corresponds to "greater than 120 mm but no greater than 400 mm". Accordingly, a tolerance of ±0.5 mm is induced as the tolerance in relation to the first factor. The same will be true with the tolerance in relation to the second factor.

A tolerance of ±0.4° is calculated as the "tolerance of the inclination angle of the straight line that connects the upper left hole and the lower left hole from the vertical direction" by obtaining an arctangent of a maximum deviation length in consideration of reference dimensions of the upper left hole and the lower left hole and the two tolerances described above.

On the other hand, a tolerance in relation to the third factor is induced by the use of values illustrated in Table 3 under paragraph 2, Section 4 of JIS0405. In an example of a preferred embodiment of the present invention, since a shorter length of the inclination angle of the straight line that connects the upper left leaning turning axis LUL and the lower left leaning turning axis LDL from the left steering turning axis SL is longer than 120 mm but no longer than 400 mm, a tolerance of ±10' (≈0.17°) is induced as the tolerance in relation to the third factor.

As a result, the "tolerance of the inclination angle of the left steering turning axis SL from the vertical direction" becomes ±0.57°, for example. Namely, in an example of a preferred embodiment of the present invention described above, when the inclination angle of the left steering turning axis SL from the vertical direction is smaller than 0.57°, it can be regarded to be true in stating that the inclination angle of the left steering turning axis SL from the vertical direction is substantially zero.

Also in leaning vehicles other than the leaning vehicle according to the preferred embodiments of the present invention, it is possible to determine a range where the inclination angle of the left steering turning axis SL from the vertical direction is substantially zero by studying the tolerance of the inclination angle of the left steering turning axis SL from the vertical direction by the use of the tolerance values specified under the medium class of JIS0405.

In the preferred embodiments of the present invention described above, the leaning vehicle 1 preferably includes the single rear wheel 4. However, the leaning vehicle 1 may include a plurality of rear wheels.

In the preferred embodiments of the present invention described above, the handlebar 61 includes the single member that extends in the left-right direction of the body frame. However, the handlebar 61 may be made up of individual members including a left handlebar portion operated by the left hand of the rider and a right handlebar portion operated by the right hand of the rider, provided that steering force to turn the left front wheel 31 and the right front wheel 32 is able to be input through the handlebar 61.

The terms and expressions that are used in this description are used to describe the preferred embodiments of the disclosed concepts and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are comprised therein. When used in this description to depict directions and members, the expression reading "along a certain direction" means that a case where something inclines at an angle falling within the range of ±40 degrees relative to the certain direction is comprised therein. When used in this description, the expression reading "something extends in a certain direction" means that a case where something extends while being inclined at an angle falling within the range of ±40 degrees relative to the certain direction is comprised therein.

When used in this description, the expression "so as not to be movable relative to the body frame 21" means that a certain element or member is caused to lean in the left-right direction of the leaning vehicle 1 together with the body frame 21 when the body frame 21 is caused to lean in the left-right direction of the leaning vehicle 1. When used in this description, the expression "so as not to be movable relative to the body frame 21" may include not only a case where a certain element or member is directly fixed to the body frame but also a case where the certain element of member is fixed to a leaning vehicle component (a fuel tank, a bracket, the engine unit 24, etc.) which is fixed on the body frame 21. Here the term "fixed" may comprehend a case that a certain element or member is fixed by way of a damping member or the like.

The disclosed concepts can be implemented with many different preferred embodiments. This description should be understood to provide preferred embodiments of the disclosed concepts. The preferred embodiments which are at least described or illustrated in this description are so described or illustrated based on the understanding that the preferred embodiments are not intended to limit the disclosed concepts.

The disclosed concepts include every preferred embodiment which includes an equivalent element, a modification, a deletion, a combination (for example, a combination of characteristics of various preferred embodiments), an improvement and an alteration which can be recognized by those skilled in the art based on the preferred embodiments disclosed in this description. The limitative matters of claims should be construed broadly based on terms used in the claims and hence should not be limited by the preferred embodiments described in this specification or the prosecution of this patent application. Those preferred embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A leaning vehicle comprising:
a body frame;
a left front wheel and a right front wheel that are arranged side by side in a left-right direction of the body frame;
a linkage that changes positions of the left front wheel and the right front wheel relative to the body frame to cause the body frame to lean to the left or to the right;
a first intermediate steering bearing defining a first intermediate steering turning axis that extends in an up-down direction of the body frame;
a first left steering bearing disposed on the left of the first intermediate steering turning axis and defining a first left steering turning axis that extends in the up-down direction of the body frame;
a first right steering bearing disposed on the right of the first intermediate steering turning axis and defining a first right steering turning axis that extends in the up-down direction of the body frame;
a left suspension coupled to the first left steering bearing and supporting the left front wheel;
a right suspension coupled to the first right steering bearing and supporting the right front wheel;
a steering member turnable relative to the body frame; and
a steering force transmission that turns the left suspension and the right suspension in accordance with a turning action of the steering member from a neutral position thereof, so that the left suspension turns about the first left steering turning axis and the right suspension turns about the first right steering turning axis respectively in a direction that the steering member is turned; wherein the linkage includes:
a first intermediate leaning bearing defining a first intermediate leaning turning axis that extends in a front-rear direction of the body frame;
a first left leaning bearing disposed on the left of the first intermediate leaning bearing and defining a first left leaning turning axis that extends in the front-rear direction of the body frame;
a first right leaning bearing disposed on the right of the first intermediate leaning bearing and defining a first right leaning turning axis that extends in the front-rear direction of the body frame; and
a leaning turnable member coupled to the first intermediate leaning bearing and being turnable about the first intermediate leaning turning axis;
a left portion of the leaning turnable member is coupled to the first left leaning bearing and is turnable about the first left leaning turning axis;
a right portion of the leaning turnable member is coupled to the first right leaning bearing and is turnable about the first right leaning turning axis;
the first left leaning bearing is displaced relative to the body frame in accordance with a leaning action of the body frame such that the left suspension is displaced relative to the right suspension while changing a posture thereof relative to the leaning turnable member;
the first right leaning bearing is displaced relative to the body frame in accordance with a leaning action of the body frame such that the right suspension is displaced relative to the left suspension while changing a posture thereof relative to the leaning turnable member;
the steering force transmission includes:
a steering turnable member coupled to the first intermediate steering bearing and that turns about the first intermediate steering turning axis in accordance with a turning action of the steering member in a direction that the steering member is turned;
a transmission member that transmits a turning force of the steering member to the left suspension and the right suspension;
a second intermediate leaning bearing defining a second intermediate leaning turning axis that extends in the front-rear direction of the body frame;
a second left leaning bearing disposed on the left of the second intermediate leaning bearing and defining a second left leaning turning axis that extends in the front-rear direction of the body frame;
a second right leaning bearing disposed on the right of the second intermediate leaning bearing and defining a second right leaning turning axis that extends in the front-rear direction of the body frame;
a second intermediate steering bearing defining a second intermediate steering turning axis that extends in the up-down direction of the body frame;
a second left steering bearing disposed on the left of the second intermediate steering bearing and defining a second left steering turning axis that extends in the up-down direction of the body frame; and
a second right steering bearing disposed on the right of the second intermediate steering bearing and defining a second right steering turning axis that extends in the up-down direction of the body frame;
the transmission member is coupled to the steering turnable member and is turnable about each of the second intermediate leaning turning axis and the second intermediate steering turning axis;

the transmission member is coupled to the left suspension and is turnable about each of the second left leaning turning axis and the second left steering turning axis;

the transmission member is coupled to the right suspension and is turnable about each of the second right leaning turning axis and the second right steering turning axis;

when the body frame is in an upright state and the steering member is in the neutral position:
  an inclination angle of each of the first left steering turning axis and the first right steering turning axis relative to a vertical direction is substantially zero when the leaning vehicle is viewed from the front;
  a first steering inter-axis distance between the first left steering bearing and the first right steering bearing differs from a second steering inter-axis distance between the second left steering bearing and the second right steering bearing;
  a difference between a first left leaning inter-axis distance between the first intermediate leaning bearing and the first left leaning bearing and a second left leaning inter-axis distance between the second intermediate leaning bearing and the second left leaning bearing is smaller than a difference between a first left steering inter-axis distance between the first intermediate steering bearing and the first left steering bearing and a second left steering inter-axis distance between the second intermediate steering bearing and the second left steering bearing; and
  a difference between a first right leaning inter-axis distance between the first intermediate leaning bearing and the first right leaning bearing and a second right leaning inter-axis distance between the second intermediate leaning bearing and the second right leaning bearing is smaller than a difference between a first right steering inter-axis distance between the first intermediate steering bearing and the first right steering bearing and a second right steering inter-axis distance between the second intermediate steering bearing and the second right steering bearing.

2. The leaning vehicle according to claim 1, wherein
an offset in the left-right direction of the body frame is provided in at least one location of:
  between the first intermediate leaning bearing and the first intermediate steering bearing;
  between the first left leaning bearing and the first left steering bearing;
  between the second intermediate leaning bearing and the second intermediate steering bearing; and
  between the second left leaning bearing and the second left steering bearing;
  such that, when the leaning vehicle is viewed from the front, the difference between the first left leaning inter-axis distance and the second left leaning inter-axis distance is smaller than the difference between the first left steering inter-axis distance and the second left steering inter-axis distance; and
an offset in the left-right direction of the body frame is provided in at least one location of:
  between the first intermediate leaning bearing and the first intermediate steering bearing;
  between the first right leaning bearing and the first right steering bearing;
  between the second intermediate leaning bearing and the second intermediate steering bearing; and
  between the second right leaning bearing and the second right steering bearing; and
  such that, when the leaning vehicle is viewed from the front, the difference between the first right leaning inter-axis distance and the second right leaning inter-axis distance is smaller than the difference between the first right steering inter-axis distance and the second right steering inter-axis distance.

3. The leaning vehicle according to claim 2, wherein
an offset in the left-right direction of the body frame is provided in at least one location of:
  between the first left leaning bearing and the first left steering bearing; and
  between the second left leaning bearing and the second left steering bearing;
  such that, when the leaning vehicle is viewed from the front, the difference between the first left leaning inter-axis distance and the second left leaning inter-axis distance is smaller than the difference between the first left steering inter-axis distance and the second left steering inter-axis distance; and
an offset in the left-right direction of the body frame is provided in at least one location of:
  between the first right leaning bearing and the first right steering bearing; and
  between the second right leaning bearing and the second right steering bearing;
  such that, when the leaning vehicle is viewed from the front, the difference between the first right leaning inter-axis distance and the second right leaning inter-axis distance is smaller than the difference between the first right steering inter-axis distance and the second right steering inter-axis distance.

4. The leaning vehicle according to claim 2, wherein
an offset in the left-right direction of the body frame is provided in at least one location of:
  between the second intermediate leaning bearing and the second intermediate steering bearing; and
  between the second left leaning bearing and the second left steering bearing;
  such that, when the leaning vehicle is viewed from the front, the difference between the first left leaning inter-axis distance and the second left leaning inter-axis distance is smaller than the difference between the first left steering inter-axis distance and the second left steering inter-axis distance; and
an offset in the left-right direction of the body frame is provided in at least one location of:
  between the second intermediate leaning bearing and the second intermediate steering bearing; and
  between the second right leaning bearing and the second right steering bearing;
  such that, when the leaning vehicle is viewed from the front, the difference between the first right leaning inter-axis distance and the second right leaning inter-axis distance is smaller than the difference between the first right steering inter-axis distance and the second right steering inter-axis distance.

5. The leaning vehicle according to claim 1, wherein
the second intermediate leaning bearing includes a second left-intermediate leaning bearing and a second right-intermediate leaning bearing;
the transmission member includes:
  a left transmission member including the second left leaning bearing and the second left steering bearing, and being turnable about each of the second left-intermediate leaning bearing and the second intermediate steering bearing; and a right transmission member including the second right leaning bearing and the second right steering bearing, and being turnable about each of the second right-intermediate leaning bearing and the second intermediate steering bearing;

when the body frame is in the upright state and the steering member is in the neutral position:

a difference between a distance between the first intermediate leaning bearing and the first left leaning bearing and a distance between the second left-intermediate leaning bearing and the second left leaning bearing is smaller than a difference between a distance between the first intermediate steering bearing and the first left steering bearing and a distance between the second intermediate steering bearing and the second left steering bearing; and a difference between a distance between the first intermediate leaning bearing and the first right leaning bearing and a distance between the second right-intermediate leaning bearing and the second right leaning bearing is smaller than a difference between a distance between the first intermediate steering bearing and the first right steering bearing and a distance between the second intermediate steering bearing and the second right steering bearing.

6. The leaning vehicle according to claim 1, wherein the linkage includes an upper cross member and a lower cross member disposed below the upper cross member in the up-down direction of the body frame;

the upper cross member and the lower cross member maintain postures thereof that are parallel to each other when changing the relative positions of the left front wheel and the right front wheel to the body frame to cause the body frame to lean to the left or right; and the leaning turnable member is at least one of the upper cross member and the lower cross member.

7. The leaning vehicle according to claim 6, wherein the linkage further includes:

a left side member supporting the left suspension turnably via the first left steering bearing; and a right side member supporting the right suspension turnably via the first right steering bearing; and the upper cross member, the lower cross member, the left side member, and the right side member are turnably connected with one another such that the upper cross member and the lower cross member are held in postures that are parallel to each other, and such that the left side member and the right side member are held in postures that are parallel to each other.

8. The leaning vehicle according to claim 1, wherein the first intermediate leaning bearing includes:

a first left-intermediate leaning bearing defining a first left-intermediate leaning turning axis that extends in the front-rear direction of the body frame; and a first right-intermediate leaning bearing defining a first right-intermediate leaning turning axis that extends in the front-rear direction of the body frame;

when the body frame is in the upright state and the steering member is in the neutral position:

a difference between a distance between the first left-intermediate leaning bearing and the first left leaning bearing and a distance between the second intermediate leaning bearing and the second left leaning bearing is smaller than a difference between a distance between the first intermediate steering bearing and the first left steering bearing and a distance between the second intermediate steering bearing and the second left steering bearing; and a difference between a distance between the first right-intermediate leaning bearing and the first right leaning bearing and a distance between the second intermediate leaning bearing and the second right leaning bearing is smaller than a difference between a distance between the first intermediate steering bearing and the first right steering bearing and a distance between the second intermediate steering bearing and the second right steering bearing.

9. The leaning vehicle according to claim 1, wherein each of the first intermediate steering bearing, the first left steering bearing, the first right steering bearing, the first intermediate leaning bearing, the first left leaning bearing, the first right leaning bearing, the second intermediate steering bearing, the second left steering bearing, the second right steering bearing, the second intermediate leaning bearing, the second left leaning bearing, and the second right leaning bearing includes a cylindrical bearing.

* * * * *